US011860366B2

(12) United States Patent
Eash et al.

(10) Patent No.: US 11,860,366 B2
(45) Date of Patent: Jan. 2, 2024

(54) ARCHITECTURE TO ILLUMINATE A DISPLAY PANEL

(71) Applicant: Avegant Corp., San Mateo, CA (US)

(72) Inventors: Aaron Matthew Eash, San Francisco, CA (US); Andrew John Gross, Chassell, MI (US); Christopher David Westra, San Carlos, CA (US); Edward Chia Ning Tang, Menlo Park, CA (US); Warren Cornelius Welch, III, Foster City, CA (US); Michael Alexander Young, Belmont, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

(21) Appl. No.: 17/449,442

(22) Filed: Sep. 29, 2021

(65) Prior Publication Data

US 2022/0099978 A1 Mar. 31, 2022

Related U.S. Application Data

(60) Provisional application No. 63/085,120, filed on Sep. 29, 2020.

(51) Int. Cl.
*G02B 27/01* (2006.01)
*G02B 27/28* (2006.01)
*F21V 8/00* (2006.01)

(52) U.S. Cl.
CPC ....... *G02B 27/0172* (2013.01); *G02B 6/0016* (2013.01); *G02B 6/0056* (2013.01); *G02B 27/283* (2013.01)

(58) Field of Classification Search
CPC .. G02B 6/0068; G02B 6/0015; G02B 6/0055; G02B 6/005; G02B 6/0031;
(Continued)

(56) References Cited

U.S. PATENT DOCUMENTS 6,222,677 B1 4/2001 Budd et al.
6,633,350 B2 10/2003 Sasakura et al.
(Continued)

FOREIGN PATENT DOCUMENTS

CN 104614858 B 2/2017
JP 2001-264682 A 9/2001
(Continued)

OTHER PUBLICATIONS

International Search Report and Written Opinion, PCT App. No. PCT/US21/71650, dated Dec. 28, 2021, 10 pages.
(Continued)

*Primary Examiner* — Mariam Qureshi
(74) *Attorney, Agent, or Firm* — Nicholson De Vos Webster & Elliott LLP; Judith Szepesi

(57) ABSTRACT

A system comprising an illumination system to direct light from one or more light sources to a limiting output pupil of a projection optomechanical system, a liquid crystal on silicon display panel (LCOS) to modulate the light from the projection optomechanical system and to direct the modulated light back toward the projection optomechanical system, and an in-coupler to a combiner waveguide to receive the modulated light from the LCOS, after it passes through the projection optomechanical system. The system in one embodiment is designed so that the light that passes through the projection optomechanical system from the illumination system lands on the LCOS within the limiting output pupil of the projection optomechanical system.

26 Claims, 39 Drawing Sheets

(58) Field of Classification Search
CPC .. G02B 6/0026; G02B 27/283; G02B 6/0056; G02B 6/0016; G02B 27/0172
See application file for complete search history.

(56) References Cited

U.S. PATENT DOCUMENTS

| | | | |
|---|---|---|---|
| 6,850,221 | B1 | 2/2005 | Tickle |
| 6,922,267 | B2 | 7/2005 | Endo et al. |
| 7,206,107 | B2 | 4/2007 | Tapani |
| 7,418,170 | B2 | 8/2008 | Mukawa et al. |
| 7,436,568 | B1* | 10/2008 | Kuykendall, Jr. . G02B 27/0172 359/245 |
| 7,710,655 | B2 | 5/2010 | Freeman et al. |
| 7,738,053 | B2 | 6/2010 | Kubota |
| 8,310,764 | B2 | 11/2012 | Tanijiri |
| 9,664,905 | B2 | 5/2017 | Bohn et al. |
| 9,779,512 | B2 | 10/2017 | Tomlin et al. |
| 10,156,896 | B2 | 12/2018 | Lee et al. |
| 10,302,835 | B2 | 5/2019 | Danziger |
| 10,732,442 | B2 | 8/2020 | Hsu et al. |
| 2002/0167733 | A1 | 11/2002 | Roest |
| 2003/0165067 | A1 | 9/2003 | Imamura et al. |
| 2004/0184717 | A1 | 9/2004 | Koontz et al. |
| 2006/0028436 | A1 | 2/2006 | Armstrong |
| 2006/0164607 | A1 | 7/2006 | Morejon et al. |
| 2007/0081123 | A1 | 4/2007 | Lewis |
| 2007/0177275 | A1 | 8/2007 | McGuire, Jr. |
| 2011/0018903 | A1 | 1/2011 | Lapstun et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0127980 | A1 | 5/2013 | Haddick et al. |
| 2013/0208234 | A1 | 8/2013 | Lewis |
| 2013/0222384 | A1 | 8/2013 | Futterer |
| 2013/0242262 | A1 | 9/2013 | Lewis |
| 2013/0242392 | A1 | 9/2013 | Amirparviz et al. |
| 2014/0063054 | A1* | 3/2014 | Osterhout ............... G06F 3/011 345/633 |
| 2014/0071539 | A1 | 3/2014 | Gao |
| 2014/0140654 | A1 | 5/2014 | Brown et al. |
| 2014/0177023 | A1 | 6/2014 | Gao et al. |
| 2014/0218468 | A1 | 8/2014 | Gao et al. |
| 2014/0240351 | A1 | 8/2014 | Scavezze et al. |
| 2014/0267420 | A1 | 9/2014 | Schowengerdt et al. |
| 2014/0293434 | A1 | 10/2014 | Cheng et al. |
| 2014/0300966 | A1 | 10/2014 | Travers et al. |
| 2014/0306866 | A1 | 10/2014 | Miller et al. |
| 2014/0320755 | A1 | 10/2014 | Martinez et al. |
| 2014/0347736 | A1 | 11/2014 | Liu et al. |
| 2015/0002528 | A1 | 1/2015 | Bohn et al. |
| 2015/0003796 | A1 | 1/2015 | Bennett |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0293358 | A1 | 10/2015 | De et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | Tekolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0067087 | A1 | 3/2016 | Tedford et al. |
| 2016/0077338 | A1 | 3/2016 | Robbins et al. |
| 2016/0131898 | A1 | 5/2016 | Chen et al. |
| 2016/0334562 | A1 | 11/2016 | Richards et al. |
| 2017/0010466 | A1 | 1/2017 | Klug et al. |
| 2017/0059879 | A1 | 3/2017 | Vallius |
| 2017/0219841 | A1 | 8/2017 | Popovich et al. |
| 2017/0242249 | A1 | 8/2017 | Wall et al. |
| 2017/0242264 | A1 | 8/2017 | Sissom |
| 2017/0248750 | A1 | 8/2017 | Curtis et al. |
| 2017/0255020 | A1 | 9/2017 | Tam et al. |
| 2017/0276940 | A1 | 9/2017 | Popovich et al. |
| 2017/0299869 | A1 | 10/2017 | Urey et al. |
| 2017/0322419 | A1 | 11/2017 | Tekolste et al. |
| 2018/0045965 | A1 | 2/2018 | Schowengerdt |
| 2018/0074457 | A1 | 3/2018 | Jolly et al. |
| 2018/0196271 | A1 | 7/2018 | Hong et al. |
| 2018/0338131 | A1* | 11/2018 | Robbins ............... G02B 27/017 |
| 2018/0341223 | A1 | 11/2018 | Shestak et al. |
| 2018/0364486 | A1 | 12/2018 | Ding et al. |
| 2019/0041634 | A1 | 2/2019 | Popovich et al. |
| 2019/0179149 | A1 | 6/2019 | Curtis et al. |
| 2019/0272802 | A1 | 9/2019 | Haba et al. |
| 2020/0019000 | A1 | 1/2020 | Hsu et al. |
| 2020/0142121 | A1 | 5/2020 | Vasylyev |
| 2020/0142356 | A1 | 5/2020 | Gilles et al. |
| 2020/0159026 | A1 | 5/2020 | Waldern et al. |
| 2020/0341281 | A1* | 10/2020 | Woods ................. G02B 5/3083 |
| 2020/0409156 | A1* | 12/2020 | Sissom ................ G02B 27/017 |
| 2021/0333629 | A1 | 10/2021 | Nichol et al. |
| 2022/0004009 | A1* | 1/2022 | Myhre ............... G02B 27/0172 |
| 2022/0283371 | A1* | 9/2022 | Tekolste ................ G02B 6/122 |

FOREIGN PATENT DOCUMENTS

| | | |
|---|---|---|
| WO | 2019/118357 A1 | 6/2019 |
| WO | 2019/178060 A1 | 9/2019 |
| WO | 2020/112836 A1 | 6/2020 |
| WO | 2020/115735 A1 | 6/2020 |
| WO | 2020/139752 A1 | 7/2020 |

OTHER PUBLICATIONS

ARToolKit: Hardware, retrieved via Internet: www.hitl.washington.edu/artoolkit/documentation/hardware.htm, retrieved Apr. 25, 2022, 3 pages.

Azuma, "A Survey of Augmented Reality," Teleoperators and Virtual Environments 6, 4 (Aug. 1997), pp. 355-385. https://web.archive.org/web/20010604100006/http://www.cs.unc.edu/-azuma/ARpresence.pdf.

Azuma, "Predictive Tracking for Augmented Realty," TR95-007, Department of Computer Science, UNG-Chapel Hill, NC, Feb. 1995.

Bimber, et al., "Spatial Augmented Reality—Merging Real and Virtual Worlds," 2005 https://web.media.mit.edu/-raskar/book/BimberRaskarAugmentedRealityBook.pdf.

Jacob, "Eye Tracking in Advanced Interface Design," Human-Computer Interaction Lab Naval Research Laboratory, Washington, D.C. I paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/proc. ACM CHI 2000 Human Factors in Computing Systems Conference, pp. 265-272, Addison-Wesley/ACM Press (2000).

* cited by examiner

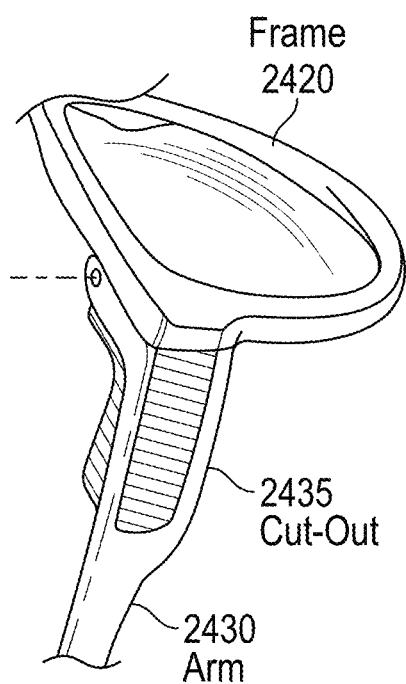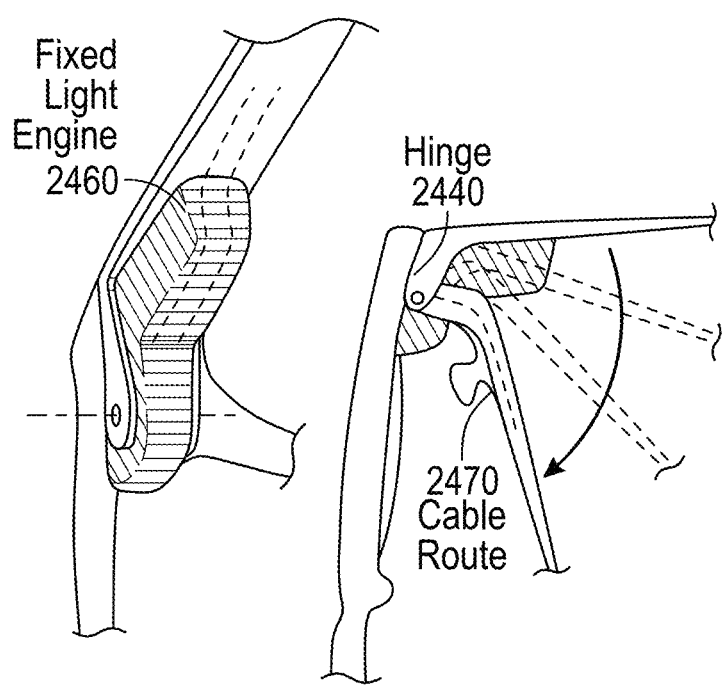
FIG. 24A  FIG. 24B  FIG. 24C
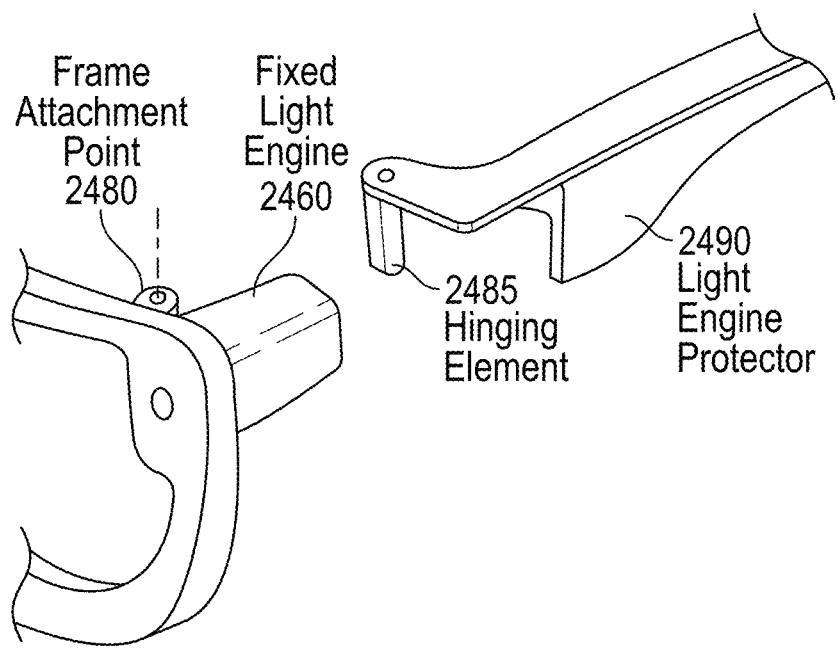
FIG. 24D

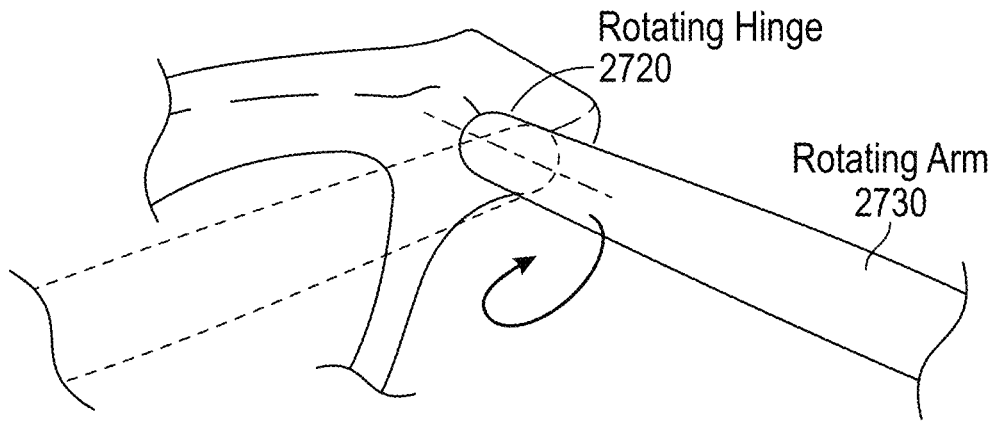
FIG. 27A
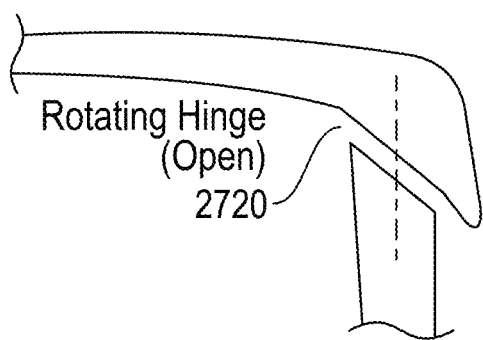 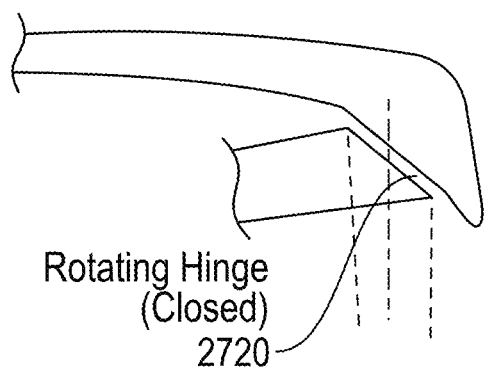
FIG. 27B   FIG. 27C

ARCHITECTURE TO ILLUMINATE A DISPLAY PANEL

RELATED APPLICATION

The present application claims priority to U.S. Provisional Patent Application No. 63/085,120, filed on Sep. 29, 2020, and incorporates that application in its entirety by reference.

FIELD

The present invention relates to an architecture for illuminating a display panel utilizing a combiner waveguide.

BACKGROUND

A traditional LCOS (liquid crystal on silicon) system, including the illumination and projection optics, is shown in FIGS. 1A-1C. LCOS is a reflective display technology that requires an external source of polarized illumination. The light is often provided by separate red, green, and blue LEDs (light emitting diodes). The light from the LEDs, in the prior art configuration, are combined using an X-cube to combine the light from the three different LEDs, providing the different colors. In some embodiments, a lens is used in front of the LED to focus the light. The output of the X-cube passes through an MLA (microlens array) which focuses the light to intermediate optics.

A range of filters and optical elements, including condenser lenses, microlens arrays, and relay lenses, shape the light to match the footprint of the LCOS panel, and give it the necessary angular properties for the projection optics. This light is reflected onto the surface of the LCOS panel using a polarizing beam splitter (PBS). Light that is modulated by the LCOS panel then passes through the PBS and enters the projection optics. When used with a waveguide (WG) in an augmented reality (AR) application, the in-coupler of the waveguide is placed at the exit pupil of the projection optics.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 24A-24C illustrate one embodiment of an arm with a cut-out.

FIG. 24D illustrates another embodiment of an arm with a cut-out.

FIGS. 27A-27C illustrate one embodiment of a rotating hinge, in which the arm is rotated to open or close.

DETAILED DESCRIPTION

The present application in one embodiment reduces the volume of traditional illumination optics by aligning the output of the illumination system to the exit pupil of the projection optics. In this context, alignment means that the illumination pupil and the imaging pupil fall within the exit pupil of the projection optics. However, they do not have to be aligned along the optical axis. In one embodiment, the design utilizes a set of optics through which the light travels twice, once from the illumination source to an LCOS panel, and once returning from the LCOS panel to the in-coupler of a combiner waveguide. In one embodiment, the design also replaces many of the elements of the traditional illumination optics with an illumination combining element, such as illumination waveguide or illumination prism, X-cube combiner, or other combining element, with its output aligned to the exit pupil of the projection optics, and uses the same optics for illumination and projection. In one embodiment, the present system may be integrated into a head-mounted device (HMD) such as glasses to display visual content to a user. In one embodiment, such glasses may be implemented with a hinging system that enables the display configuration shown in a glasses configuration which has a hinging mechanism that functions like a traditional glasses hinge, while providing structure for the light engine.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
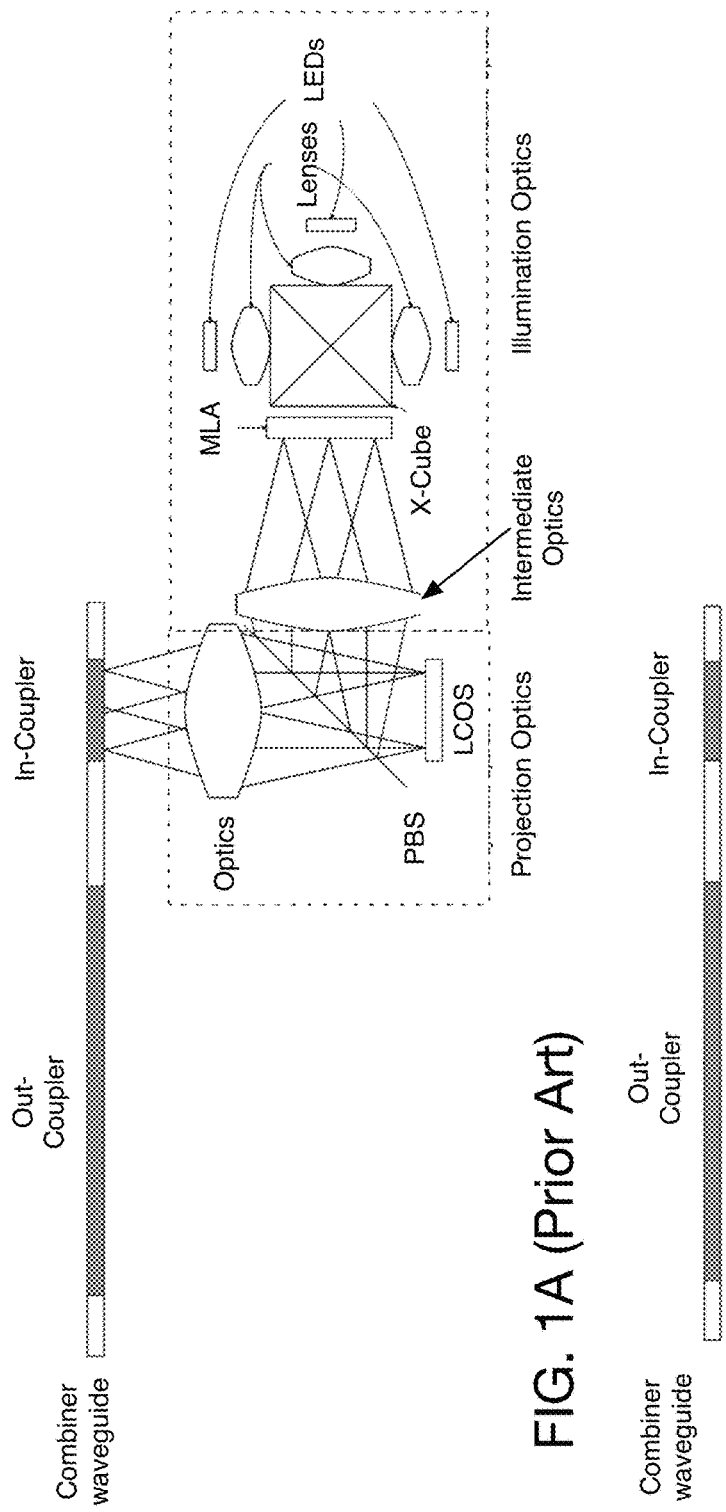
FIGS. 1A-1C illustrate prior art configurations of LCOS-based systems.
Figure 1B:
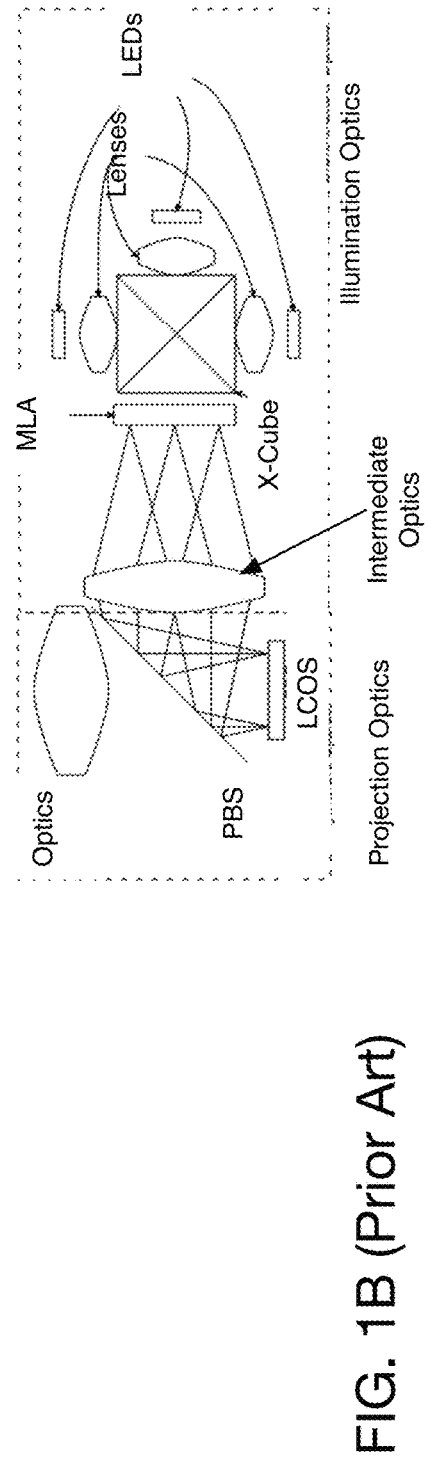
Figure 1C:
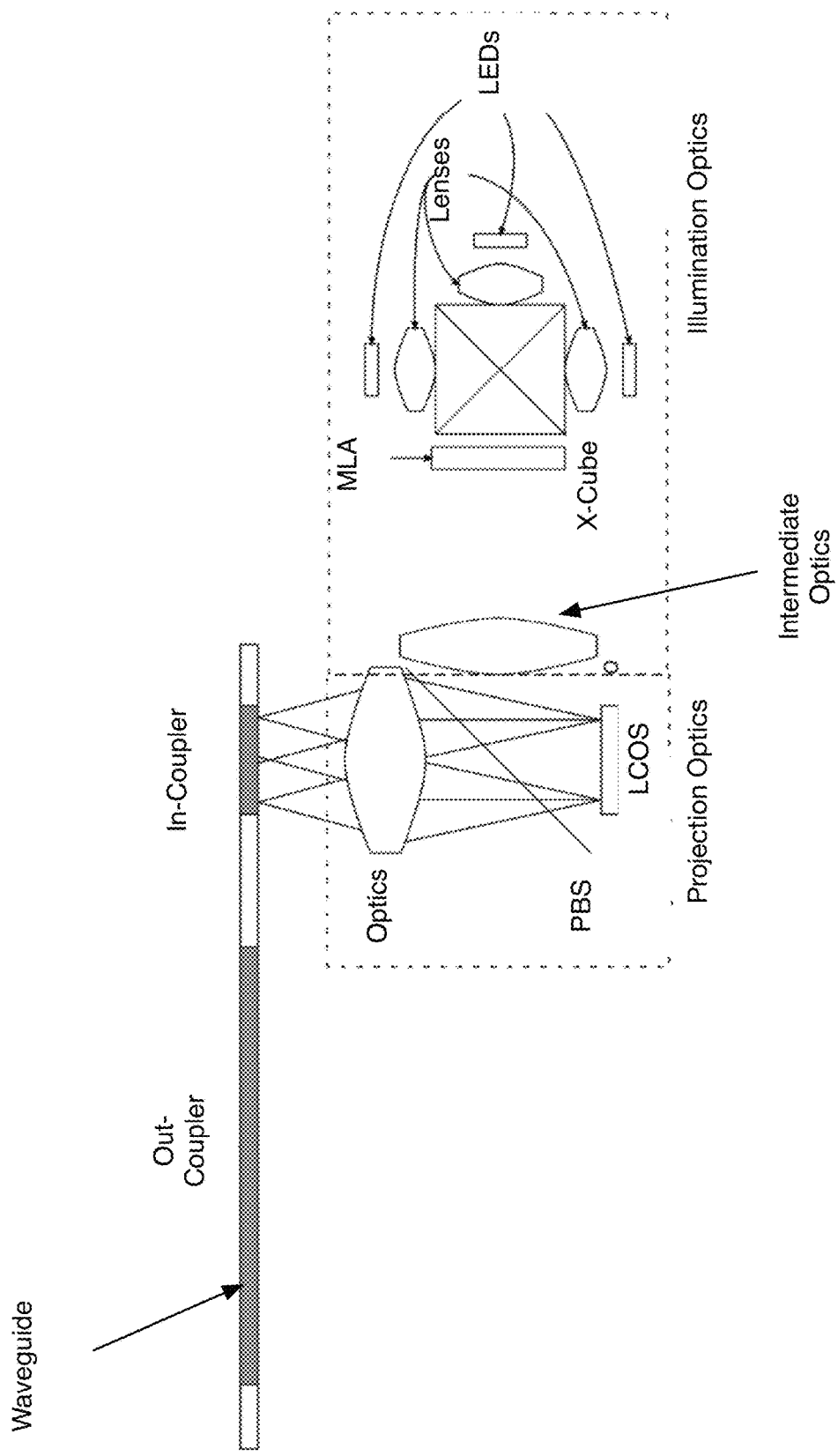
Figure 2:
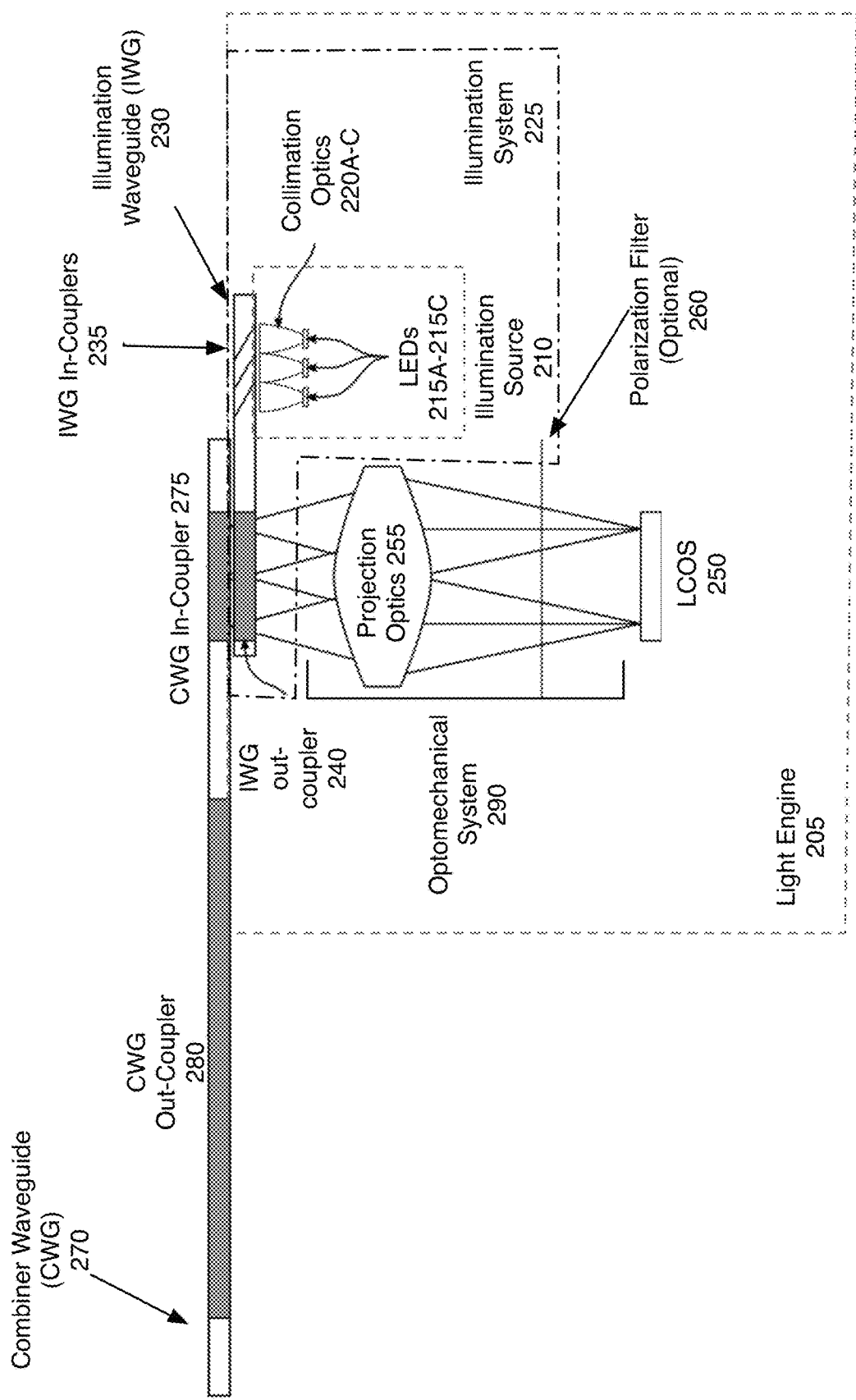
FIG. 2 illustrates one embodiment of the use of an illumination system and combiner waveguide.

FIG. 2 illustrates one embodiment of the system 200. The illustrated design shows the light sources and waveguides for one eye. In one embodiment, an identical configuration is used for the other eye in a pair of glasses or goggles to display virtual reality, augmented reality, or mixed reality content to a user. In one embodiment, the light engine 205 outputs the image for display 250 to the combiner waveguide 270, which outcouples the image for viewing to a user via out-coupler 280. The out-coupler 280 may be incorporated into a lens of smart glasses, goggles, or similar viewing apparatus.

The illumination system 225 includes an illumination source 210 and illumination light combiner 230. In one embodiment the illumination source 210 consists of separate red, green, and blue LEDs 215A, 215B, 215C, each with a separate collimating optic 220A, 220B, 220C. In one embodiment, the three LEDs can be incorporated into a single package, and utilize a single set of collimating optics. In one embodiment, these collimating optics 220 include a compound parabolic concentrator (CPC), which may have a variety of shapes, including square, rectangular, hexagonal, and round. In one embodiment, the illumination system is catadioptric. In one embodiment, the collimating optics 220 include refractive optics. In one embodiment, the collimating optics 220 include diffractive optics. In one embodiment, the collimating optics 220 include a combination of a CPC and refractive or diffractive optics. In one embodiment, the illumination source 210 is a microLED array. In one embodiment, the illumination source 210 is one or more lasers.

The light from the illumination source 210 is in-coupled into an illumination waveguide 230. The illumination waveguide 230 can also be referred to as the illumination system, and may be replaced by a prism, X-cube, or other type of illumination light combiner. In some embodiments, as shown below, the illumination waveguide 230 may be replaced with a light combiner and collimation optics. In another embodiment, the illumination system may be replaced by a portion of the combiner waveguide, through which the light passes, as is described below. While the illumination waveguide 230 is illustrated as a short waveguide, its length may be adjustable to move the light from the light source 210 to a combiner.

The in-couplers 235 may be dichroic filters, in one embodiment. In another embodiment, the in-couplers 235 are diffractive gratings. In one embodiment, the in-couplers 235 are volume holograms. In one embodiment the in-coupler 235 is a mirror and the colors from the illumination source 210 are combined prior to coupling into the illumination waveguide 230. Other types of in-couplers 235 may be used.

The out-coupler 240 of the illumination waveguide 230 is located in front of the combiner waveguide in-coupler 275, and directs light toward an optomechanical system 290. The optomechanical system 290, in one embodiment, includes projection optics 255 and LCOS panel 250. In one embodiment, the out-coupler 240 is sized to match the area of the exit pupil of the projector, and the angle of the out-coupled light matches the field of view of the projection optics 255. In one embodiment, the out-coupler 240 is one or more polarizing beam splitters. In one embodiment, the out-coupler 240 beam splitter is made with dielectric films. In one embodiment, the out-coupler 240 beam splitter is made with a wire grid polarizer. In one embodiment, the out-coupler 240 is one or more partially reflective elements. In one embodiment, the out-coupler 240 is a diffractive element. In one embodiment, the diffractive element is a surface relief grating. In one embodiment, the diffractive element is a volume hologram. Other types of out-couplers 240 may be used.

After exiting the illumination waveguide 230, the light goes through the projection optics 255 to the surface of the LCOS panel 250. The projection optics 255 comprise one or more lenses and other optical elements. While the projection optics are shown linearly aligned with LCOS 250, in a real configuration the light output by the out-coupler 240 may be redirected at any angle.

In one embodiment, when the illumination waveguide 230 does not use a polarization selective out-coupler 240, a polarization filter 260 or beam splitter is included in the projection optics. The polarization filter 260 may also be used when the incoming light from the illumination waveguide is polarized, as a clean-up filter. The polarization filter 260 may be positioned anywhere between the illumination waveguide and the LCOS panel if the incoming light is not polarized. In one embodiment, if the light from the illumination waveguide 230 is polarized, the polarization filter may be anywhere between the illumination waveguide and the LCOS panel or the LCOS panel and the in-coupler of the combiner waveguide. The LCOS panel 250 modulates the polarization of the light and reflects it back through the projection optics 255. A portion of the modulated light passes through the illumination waveguide out-coupler 240 and into the in-coupler 275 of a combiner waveguide 270 (CWG).

In one embodiment, all of the illumination light that exits the illumination waveguide 230 and lands on the LCOS panel 250 also falls within the volume of the light that would form the limiting output pupil of the projection optics. The "limiting output pupil of the projection optics" is defined as the hypothetical exit pupil formed by the projection optomechanical system 290 in the case where the display is illuminated at the maximum f/# supported by the projection optics. Here, the optomechanical system 290 means the optical elements as well as any mechanical components in the design that would limit the optical path. In one embodiment, additional light exits the illumination system outside the limiting output pupil, but this portion of the light does not reach the LCOS panel 250.

In one embodiment, the light that exits the illumination system and lands on the LCOS panel 250 transits through all of the elements of the projection optics 255.

There are a number of different arrangements of the illumination waveguide (IWG) that are possible. In one embodiment, the IWG 230 is between the CWG 270 and projection optics 255, and the IWG 230 is straight, as illustrated in FIG. 2.

In one embodiment, the limiting aperture of the illumination system and the imaging pupil are both within the limiting output pupil of the projection optics, but they are not co-planar along the optical axis of the system (i.e., they have different distances along the direction of the optical axis from the projection optics). In another embodiment, the illumination pupil and the imaging pupil are co-planar along the optical axis of the system.

In one embodiment, the system may add optical power on the out-coupler of the illumination waveguide 230. The optical power may be polarization specific. In one embodiment, this means that the optical power is applied only to the out-coupled light, and not to the light that passes through the illumination waveguide out-coupler 240, to the in-coupler 275 of the combiner waveguide 270.

Figure 3:
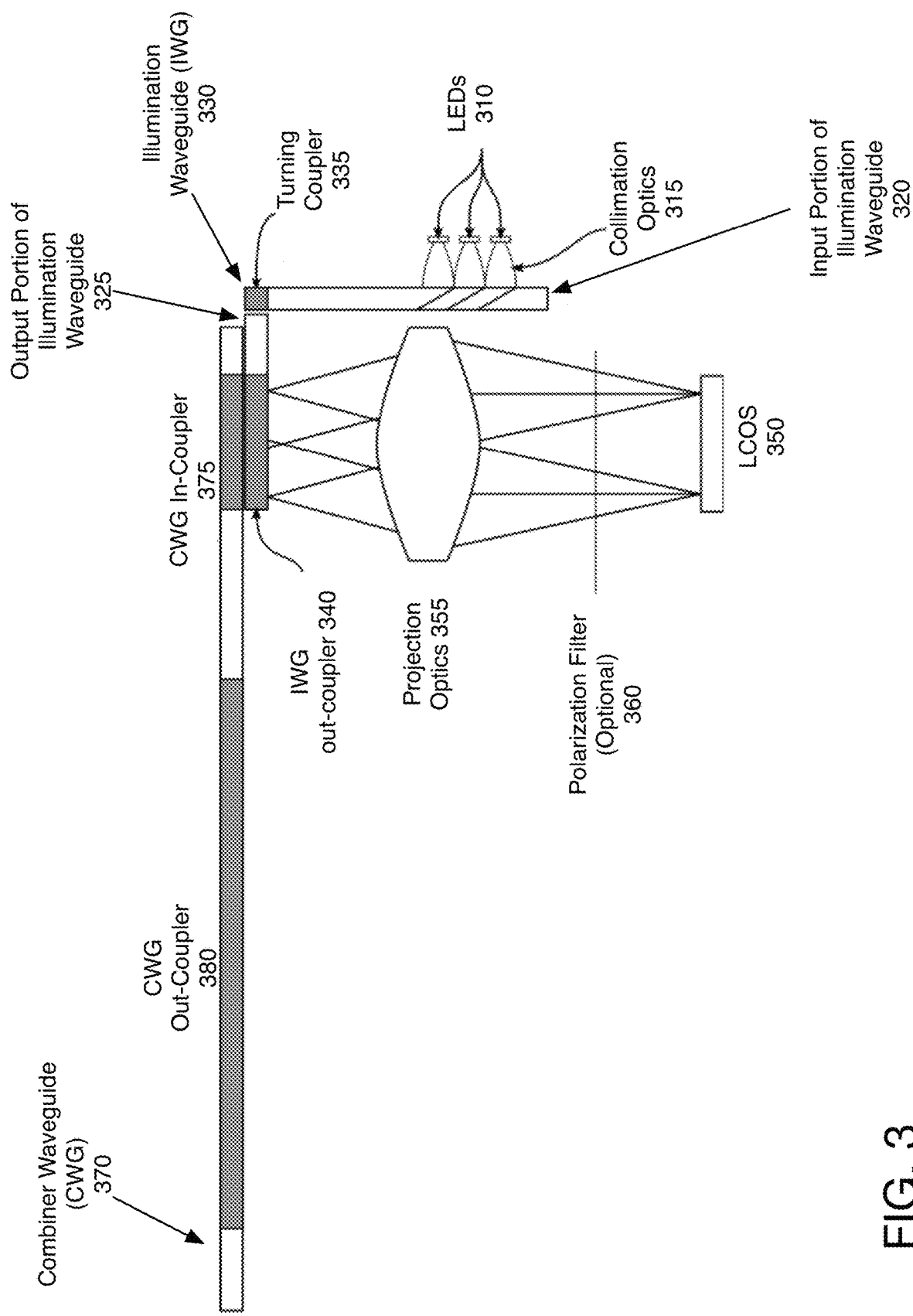
FIG. 3 illustrates one embodiment of an alternate configuration, in which the illumination waveguide contains a corner.

FIG. 3 illustrates one embodiment of an alternate configuration, in which the illumination system contains a corner. In one embodiment the illumination system includes LEDs 310, collimation optics 315, illumination waveguide 330, and turning coupler 335. IWG 330 uses a turning coupler 335 to steer the light from LEDs 310 around a corner. In one embodiment, the turning coupler 335 is a surface relief grating. In one embodiment, the turning coupler 335 is a mirror. In one embodiment, the turning coupler 335 is a reflective element.

In this embodiment, the illumination waveguide 330 includes two parts, the input portion 320, and the output portion 325. The input portion 320 includes the in-coupler, while the output portion 325 includes the out-coupler 340. Although the two pieces are illustrated at right angles, the configuration may have the input portion 320 of the illumination waveguide 330 at a variety of angles compared to the output portion 325, including out of plane. In one embodiment, the input portion of the waveguide 320 may be at any angle which can be turned using turning coupler 335. The input portion 320 of the waveguide 330 may extend along all three dimensions, including the Z-axis (protruding from the paper). The light out-coupled by the out-coupler 340 of the IWG 330 goes through projection optics 355, to LCOS 350. The modulated light returned by LCOS 350 passes again through projection optics 355, to the in-coupler 375 of the combiner waveguide 370.

Figure 4:
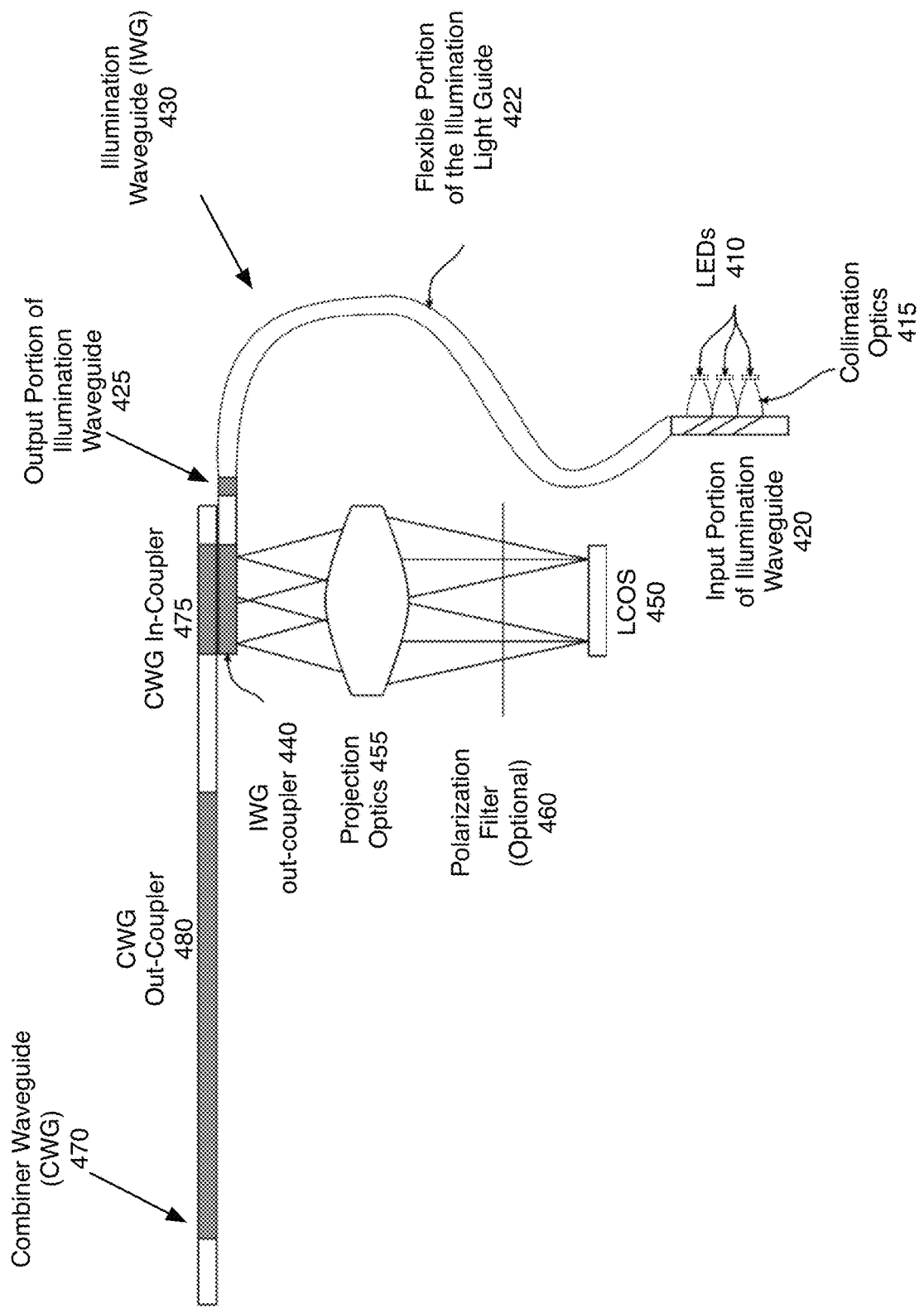
FIG. 4 illustrates one embodiment of the illumination waveguide including a curved element.

In another embodiment, the illumination waveguide includes a curving element. FIG. 4 illustrates one embodiment of the illumination waveguide including a curved element. The light from the light sources 410 is steered by curving the illumination waveguide 430. The curved portion 422 of the waveguide may be flexible, or may be rigid. In one embodiment, in this configuration the illumination waveguide 430 has three portions, the input portion 420, the output portion 425, and between them a curved portion 422. In one embodiment, the curved portion 422 of the illumination waveguide 430 is a fiber optic cable. In one embodiment, the curved portion 422 of the illumination waveguide 430 is a fiber optic bundle. In another embodiment, the curved portion 422 of the illumination waveguide 430 is a light guide. While the illustration shows the curved portion 422 being in a plane with the input portion 420 and the output portion 425 of the illumination waveguide 430, the various elements may not be in a plane, but rather may be angled in any way. The advantage of using an illumination waveguide with a curved portion 422 is that the relative positioning of the input portion 420 and output portion 425 of the illumination waveguide 430 can have any relationship, and can be at any distance. The remaining elements, projection optics 455, LCOS 450, combiner waveguide 470, with in-coupler 475 and out-coupler 480 in one embodiment operate similarly as the configuration described previously.

Figure 5:
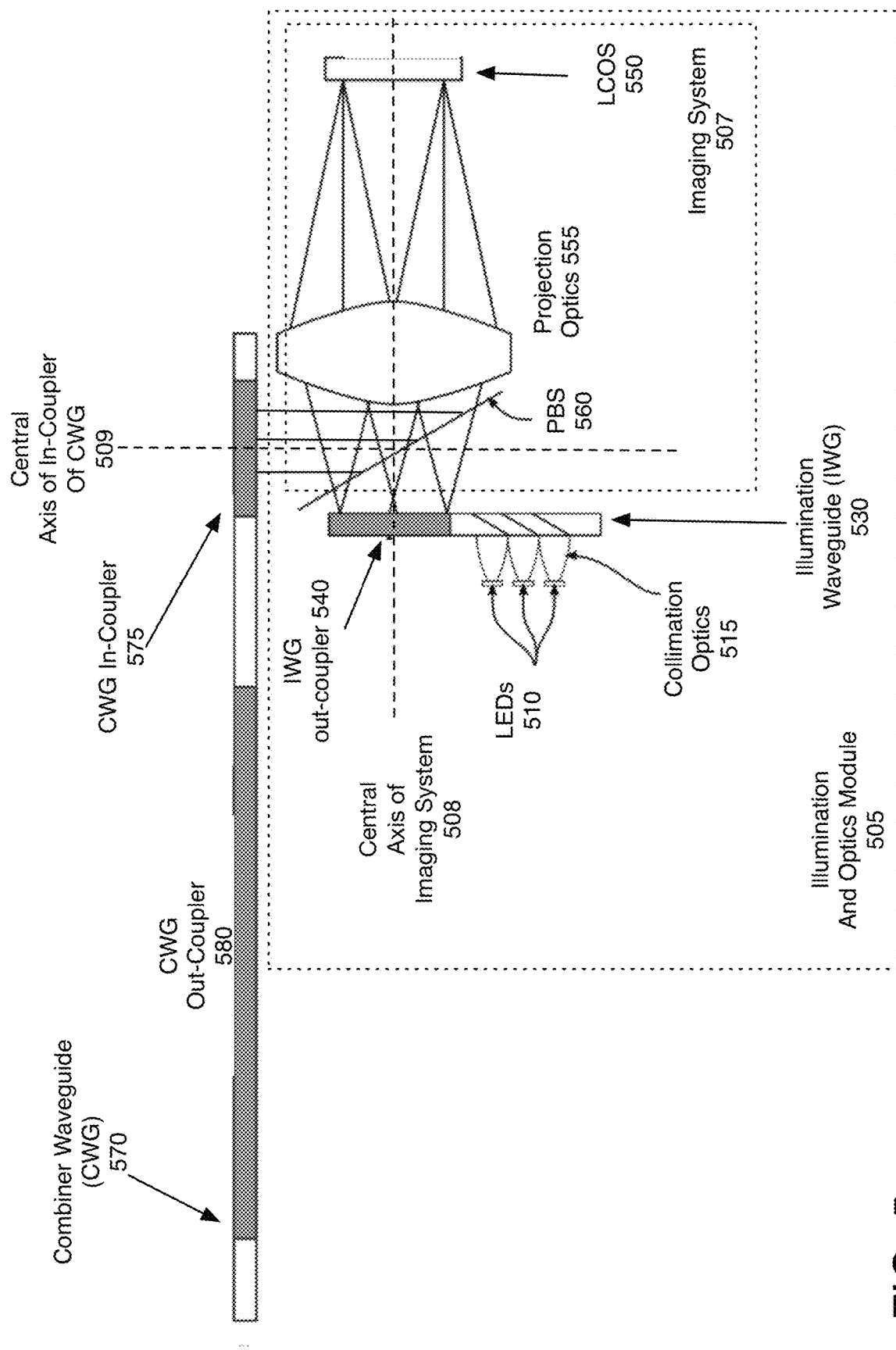
FIG. 5 illustrates one embodiment of an illumination waveguide in which a polarizing beam splitter is used to enable shifting of the elements.

FIG. 5 illustrates one embodiment of an illumination waveguide in which a polarizing beam splitter is used to enable shifting of the elements. In one embodiment, the polarizing beam splitter 560 is positioned between the out-coupler 540 of the illumination waveguide 530 and the projection optics 555 as shown in FIG. 5. This enables the reorientation of the projection optics 555 and alternate positioning of the light source including LEDs 510 and collimation optics 515. Other configurations may be used. The illumination and optics module 505 could be rotated to any angle around the central axis 509 of the in-coupler of the combiner waveguide 570. The illumination waveguide 530 could be rotated around the central optical axis 508 of the imaging system 507. The in-coupler 575 of the combiner waveguide 570 is matched in size and orientation to the optics.

Figure 6:
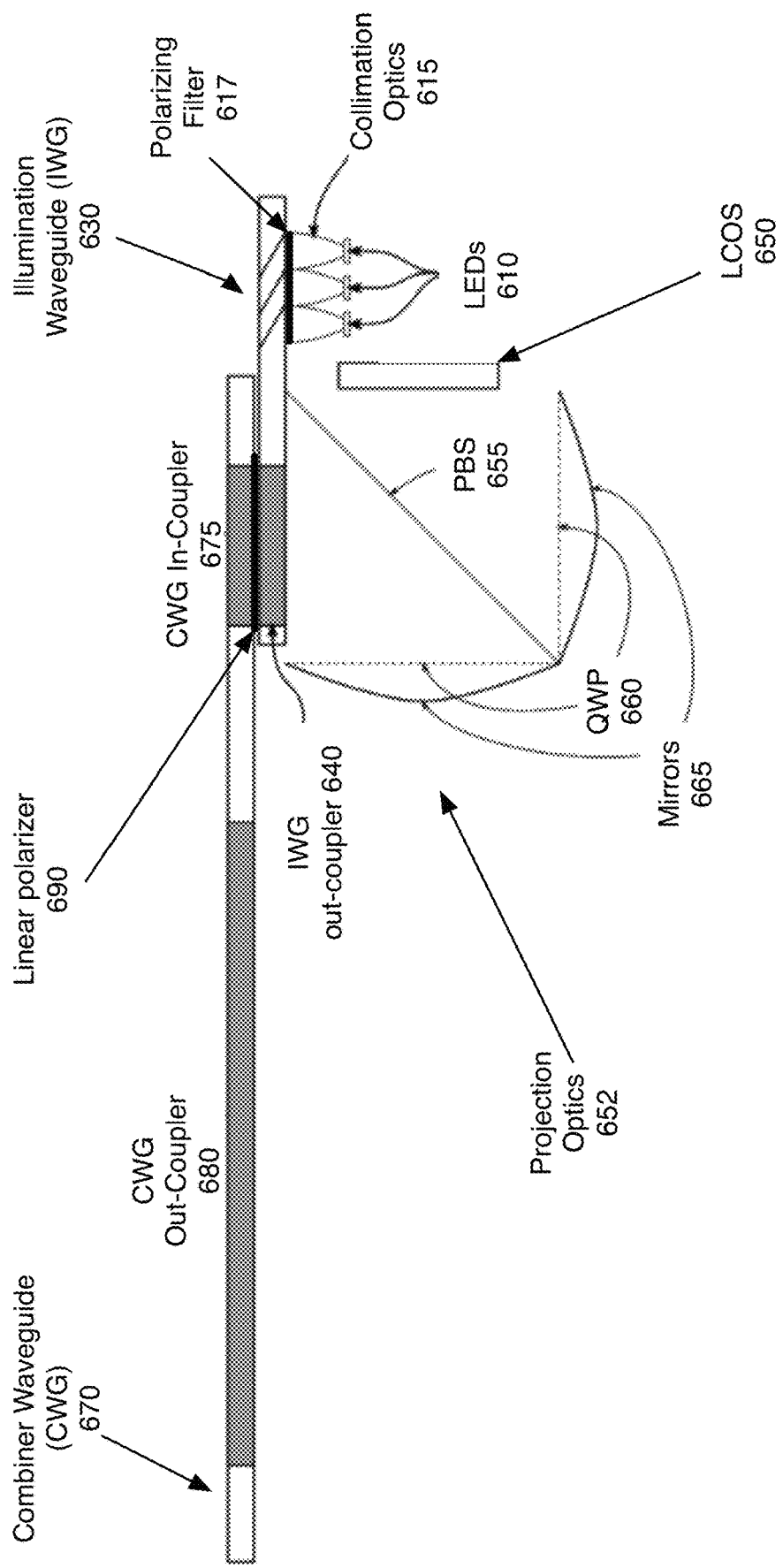
FIG. 6 illustrates one embodiment of a configuration in which the projection optics include a reflective mirror.

FIG. 6 illustrates one embodiment of a configuration in which the projection optics include a reflective mirror. In such an embodiment, a pair of reflective mirrors 665 may be used to direct the light from the illumination waveguide 630 to the LCOS panel 650. In one embodiment, the light from LEDs 610 is polarized. In another embodiment, the light is polarized before entering the illumination waveguide 630 by polarizing filter 617, so that all light exiting the illumination waveguide has a uniform polarization. In another embodiment, the illumination waveguide 630 may include a polarization converter, described in more detail below.

In this configuration, the light from the out-coupler 640 of the illumination waveguide 630 passes through a polarizing beam splitter 655, then through quarter wave plate 660, and is bounced back by the first mirror 665. Because of the quarter wave plate 660, the polarization is rotated, and the polarizing beam splitter 655 reflects the light to the LCOS 650. The LCOS modulated light is then passed through the polarizing beam splitter 655, and passes through the second quarter wave plate 660. It is reflected by the second mirror 665, and with its rotated polarization, reflected by the polarizing beam splitter 655 to the in-coupler 675 of the combiner waveguide 670. In one embodiment, there is linear polarizer 690 in front of the in-coupler 675 of the combiner waveguide 670. Thus, the projection optics 652 in this embodiment include two mirrors 665, two quarter wave plates 660, and a polarizing beam splitter 655. The curvature of the mirrors applies an optical power, in one embodiment.

Figure 7A:
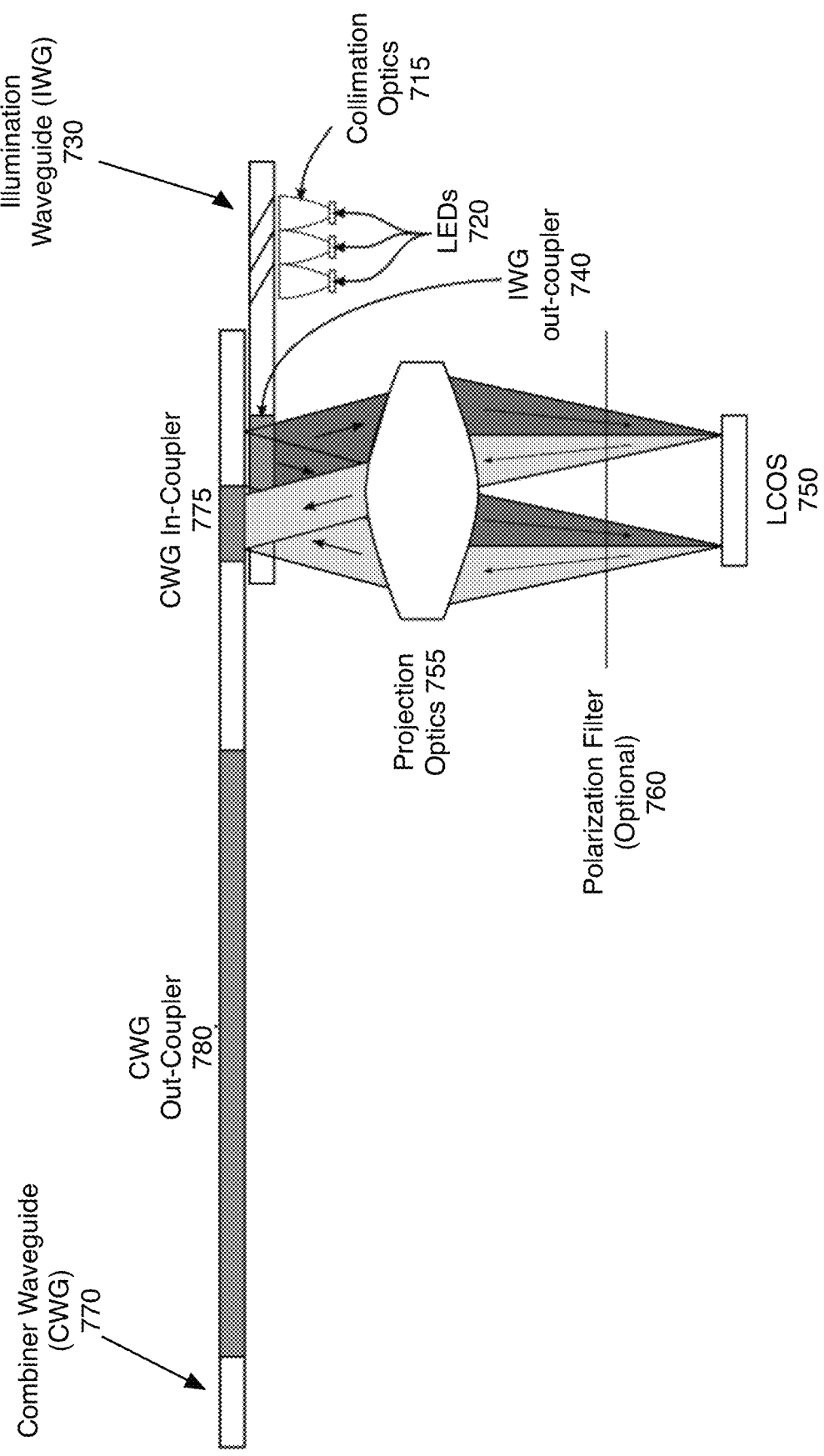
FIG. 7A illustrates one embodiment of the dual waveguides where the output of the illumination waveguide and input of the combiner waveguide are offset with respect to each other.

FIG. 7A illustrates one embodiment of the dual waveguides where the output of the illumination waveguide 730, and input of the combiner waveguide 770 are offset with respect to each other. In this case, the illuminating light from the illumination waveguide 730 is offset spatially from the light returning from the LCOS 750 through the projection optics 755. This arrangement allows for additional configuration options.

In one embodiment, the illumination waveguide 730 is positioned between the combiner waveguide 770 and the projection optics 755. Note that the illustration shows the light waves in two positions, but of course real light would extend over the entire area. Although the offset between the illumination waveguide out-coupler 740 and the combiner waveguide in-coupler 775 is shown as being to the right, one of skill in the art would understand that the offset may be along any dimension, and in any direction. In one embodiment, the in-coupler 775 and out-coupler 740 are not in the same plane.

Figure 7B:
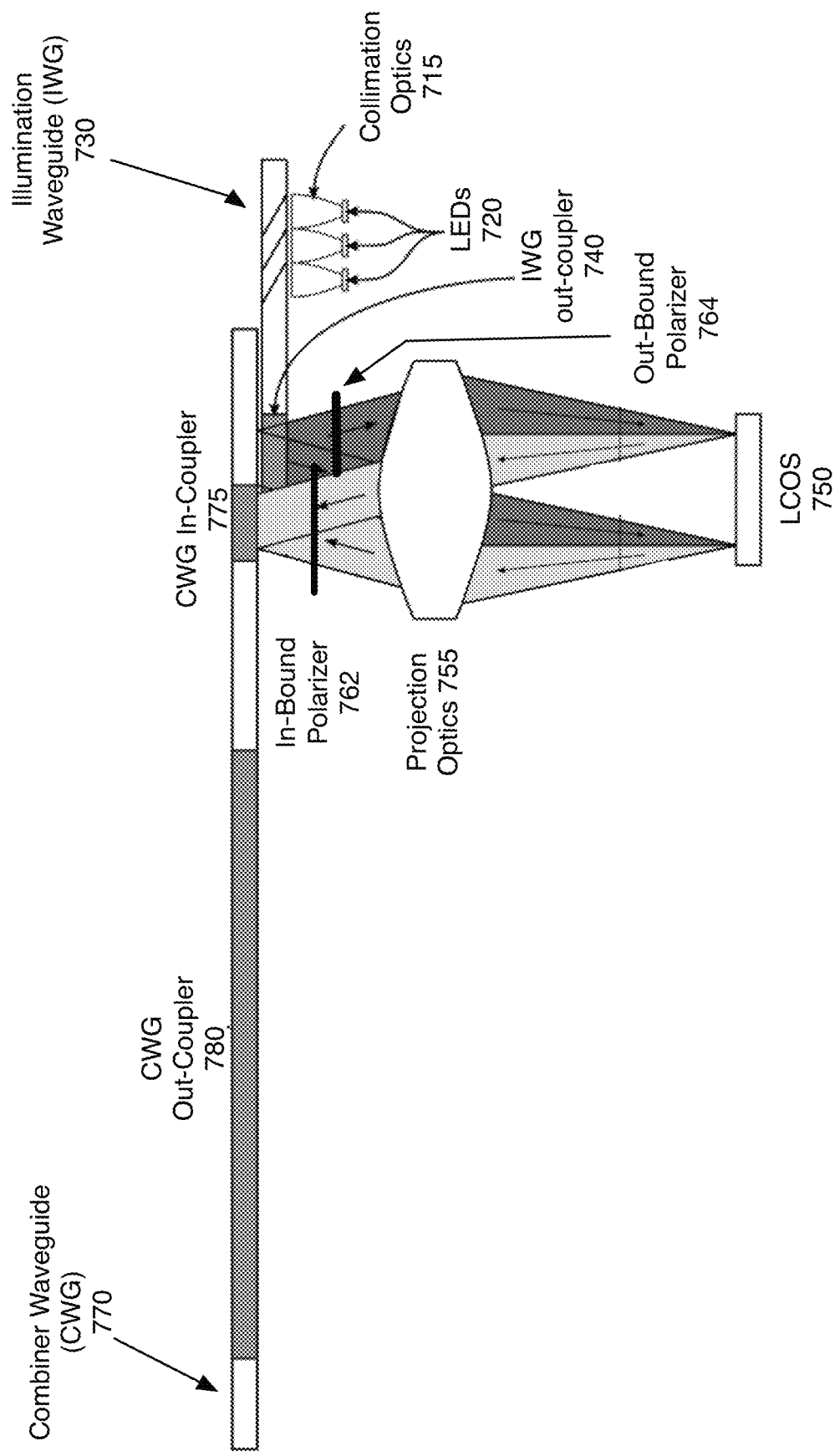
FIG. 7B illustrates another embodiment of the dual waveguides that are offset.

FIG. 7B illustrates a modified version of the dual waveguides. In this embodiment, the illumination waveguide 730 does not extend past the IWG out-coupler 740. Additionally, the system includes an out-bound polarizer 764 that the light passes through from the out-coupler 740 of the illumination waveguide 730, and a separate in-bound polarizer 762 that the light passes through when it is returning from LCOS 750, prior to entering the in-coupler 775 of the combiner waveguide 770. In one embodiment, the out-bound polarizer 764 and in-bound polarizer 762 are co-planar. In another embodiment, the in-bound and out-bound polarizers are not co-planar. In one embodiment, the in-bound and out-bound polarizers are linear polarizers with their fast axes orthogonal to one another.

Figure 8:
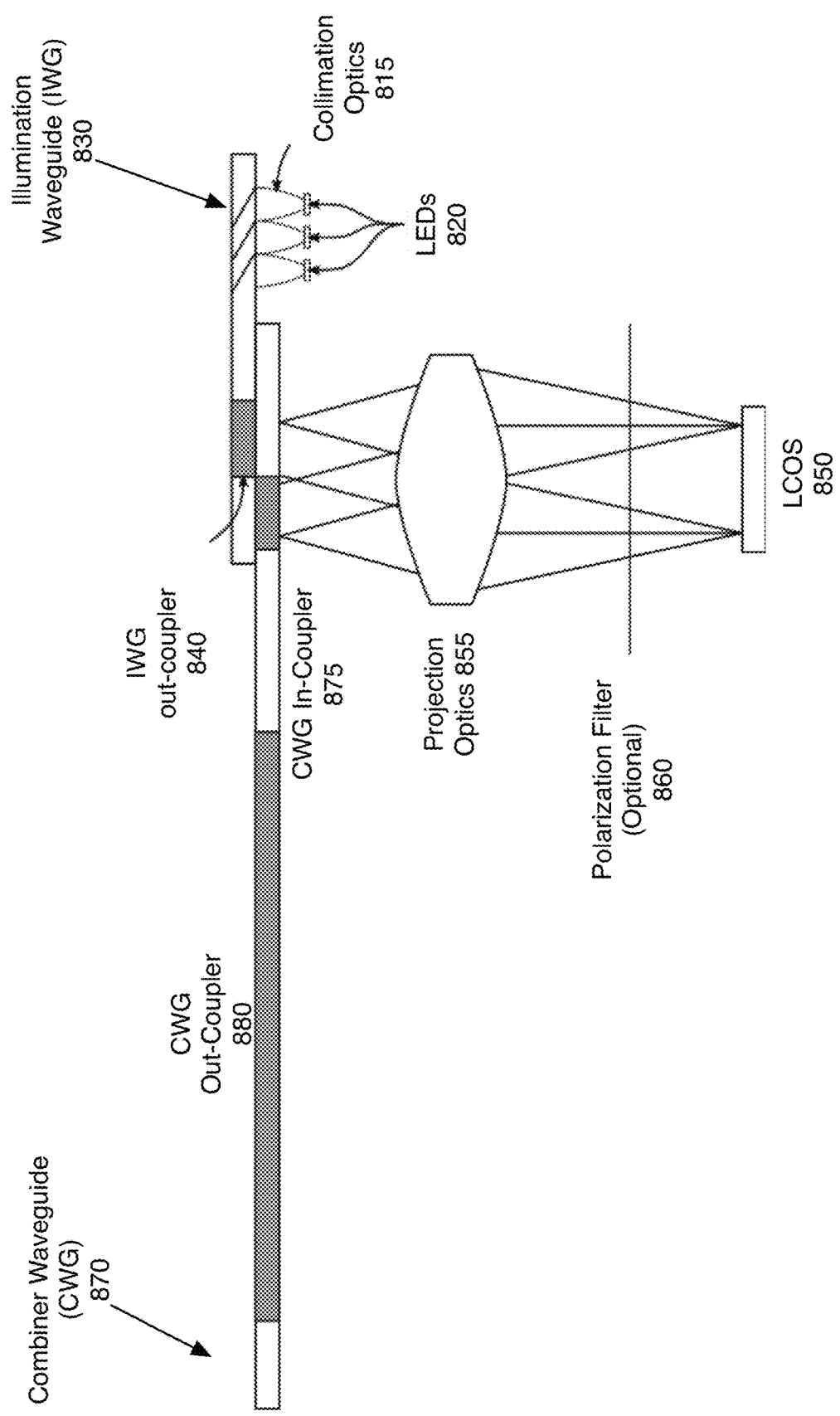
FIG. 8 illustrates another embodiment in which the illumination waveguide is positioned behind the combiner waveguide.

FIG. 8 illustrates another embodiment in which the illumination waveguide is positioned behind the combiner waveguide. The light travels in a similar pattern as the light in FIGS. 7A and 7B, with the light from the illumination waveguide 830 out-coupler 840 traveling through the combiner waveguide 870, prior to hitting projection optics 855. The returning light from LCOS 850 does not travel through the illumination waveguide 830, but rather enters directly into the in-coupler 875 of the combiner waveguide 870. In one embodiment, the polarization filter 860 may be replaced by separate in-bound and out-bound polarization filters, as illustrated in FIG. 7B.

Figure 9:
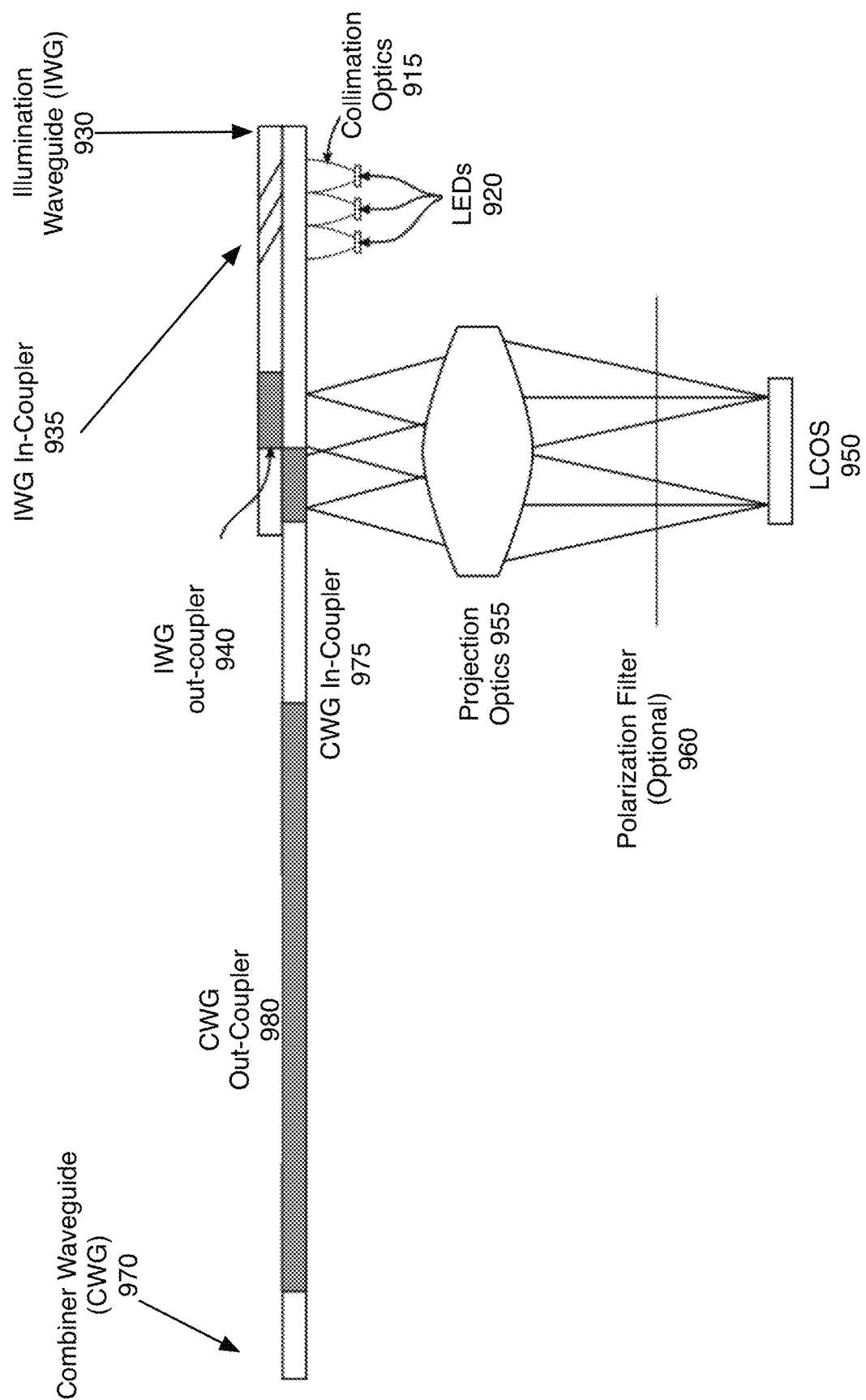
FIG. 9 illustrates one embodiment of the waveguides, in which the illumination waveguide fully overlaps the combiner waveguide.

FIG. 9 illustrates one embodiment of the waveguides, in which the illumination waveguide fully overlaps the combiner waveguide. In one embodiment the illumination waveguide 930 is positioned behind the combiner waveguide 970, and the light 920 from collimation optics 915 passes through the combiner waveguide 970, prior to entering the illumination waveguide 930, through in-coupler 935 as in FIG. 9.

Figure 10:
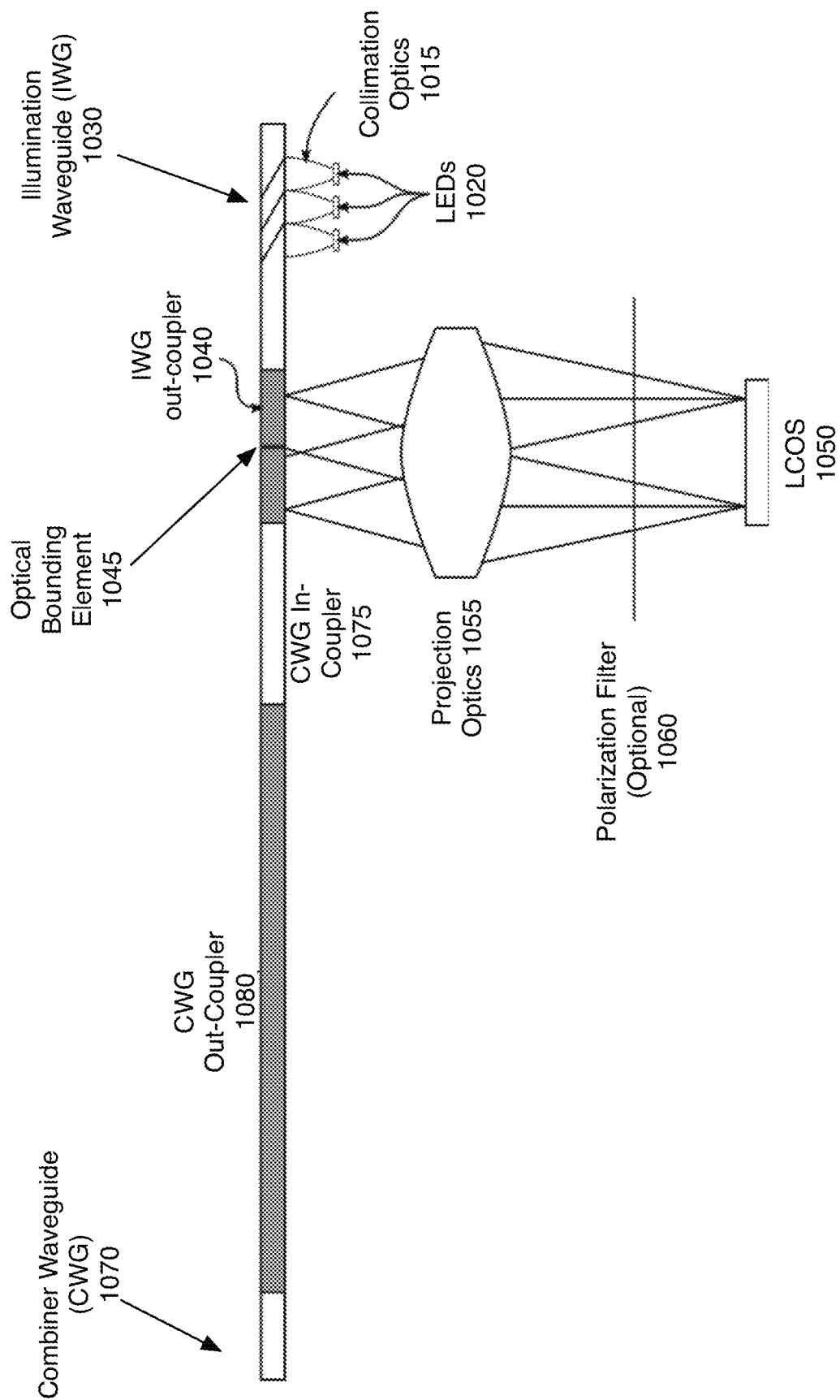
FIG. 10 illustrates one embodiment of the waveguides, in which the illumination waveguide is adjacent to the combiner waveguide.

FIG. 10 illustrates one embodiment of the waveguides, in which the illumination waveguide is adjacent to the combiner waveguide. In one embodiment, the out-coupler 1040 of the illumination waveguide 1030 is directly adjacent to the in-coupler 1075 of the combiner waveguide 1070. In one embodiment, the combiner waveguide 1070 and the illumination waveguide 1030 may be made from a single piece. In one embodiment, the out-coupler 1040 of the illumination waveguide 1030 is separated from the in-coupler 1075 of the combiner waveguide 1070 via an optical bounding element 1045. The optical bounding element 1045 keeps light from crossing between the two waveguides 1030, 1070. In one embodiment, the optical bounding element 1045 is non-reflective. In one embodiment, optical bounding element 1045 may be a layer of light absorbing paint or ink, metal, thin film black carbon, polarizer material, carbon, or another visible light absorbing layer may be used. In one embodiment, optical bounding 1045 is reflective on the IWG side of the element.

Figure 11:
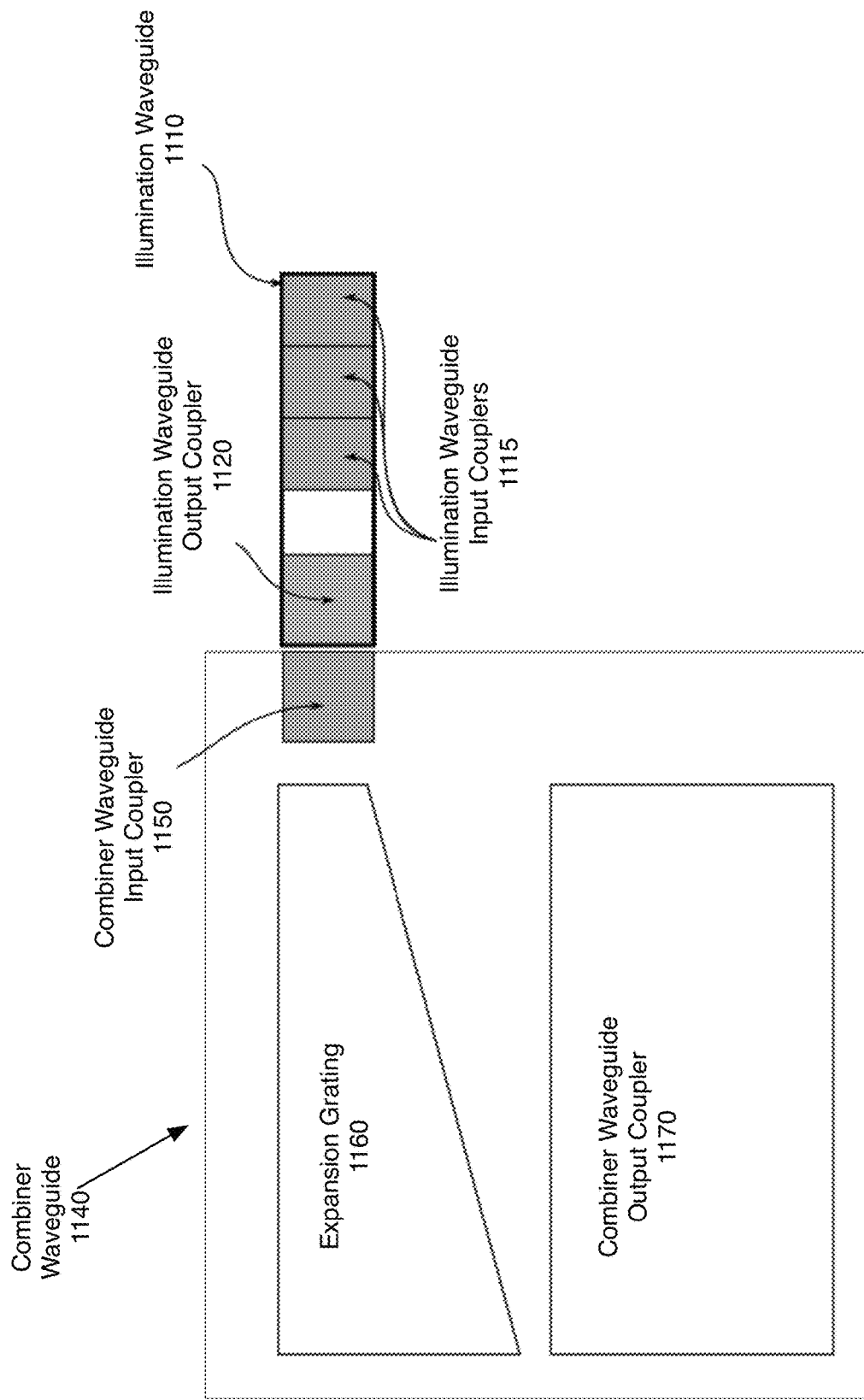
FIG. 11 illustrates one embodiment of another view of the waveguides with the out-coupler of the illumination waveguide and the in-coupler of the combiner waveguide next to each other.

FIG. 11 illustrates one embodiment of another view of the waveguides with the out-coupler of the illumination waveguide and the in-coupler of the combiner waveguide next to each other. In one embodiment, the illumination waveguide 1110 has in-couplers 1115 for each of the LEDs. In another embodiment, the in-couplers may be a single in-coupler, as shown above.

The out-coupler 1120 of the illumination waveguide 1110 out-couples the light toward an LCOS (not shown) which would be extending out of the drawing, if illustrated. The modulated light from the LCOS is reflected into the combiner waveguide 1140 in-coupler 1150. In one embodiment, an expansion grating 1160 is used, and the light is directed to the combiner waveguide 1140 out-coupler 1170.

Figure 12:
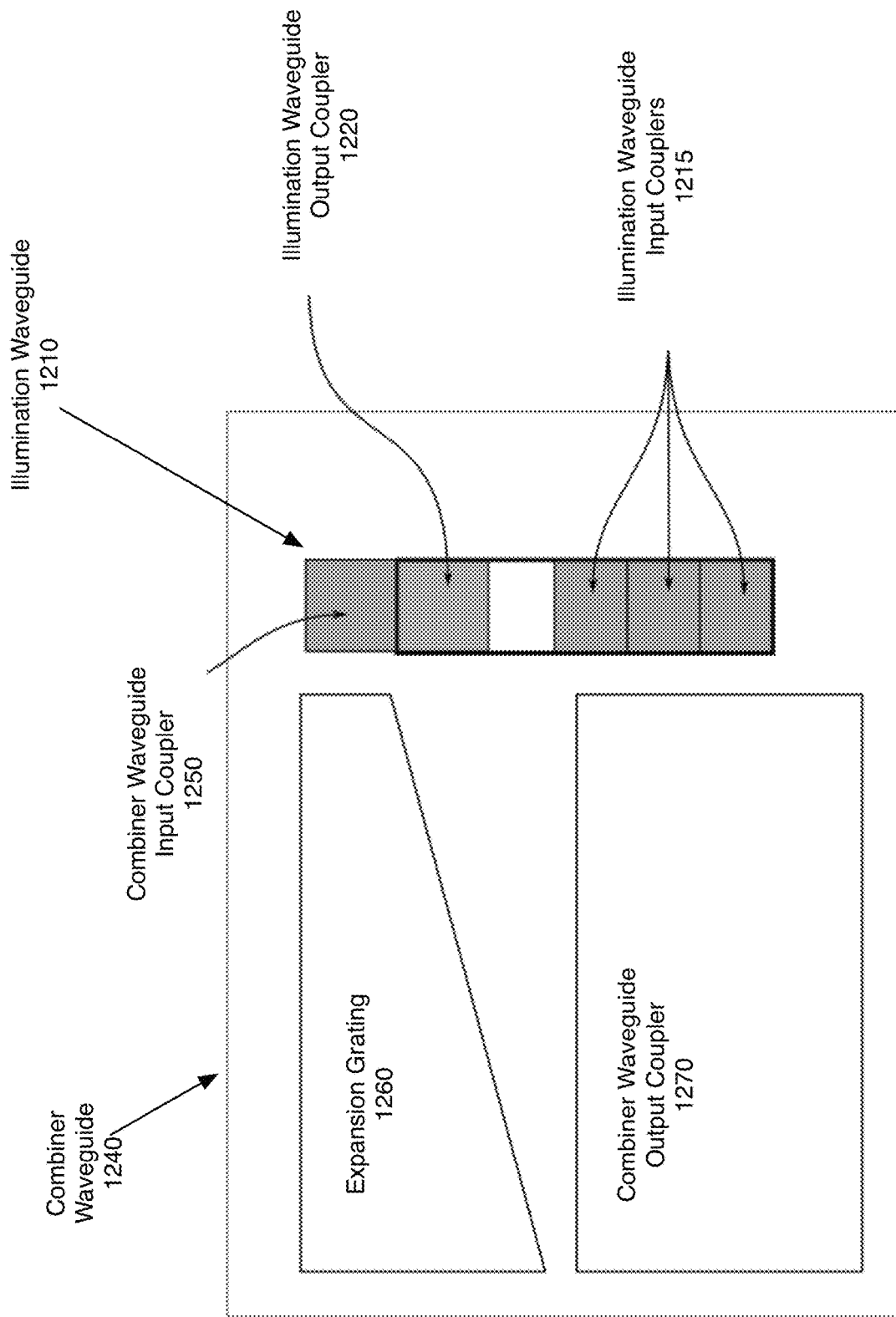
FIG. 12 illustrates one embodiment of another view of a single piece of glass or other material, which form both the illumination waveguide and the combiner waveguide.

FIG. 12 illustrates one embodiment of another view of a single piece of glass or other material, which form both the illumination waveguide and the combiner waveguide. In this configuration, the waveguides may be on the same piece of glass. In one embodiment, illumination waveguide 1210 is positioned parallel to the combiner waveguide 1240. The illumination waveguide out-coupler 1220 out couples the light to the LCOS (not shown) which extends from the plane of the waveguide. The light returning from the LCOS is in-coupled into the combiner waveguide 1240 through combiner waveguide in-coupler 1250. In one embodiment, an expansion grating 1260 directs the light to combiner waveguide out-coupler 1270.

Figure 13A:
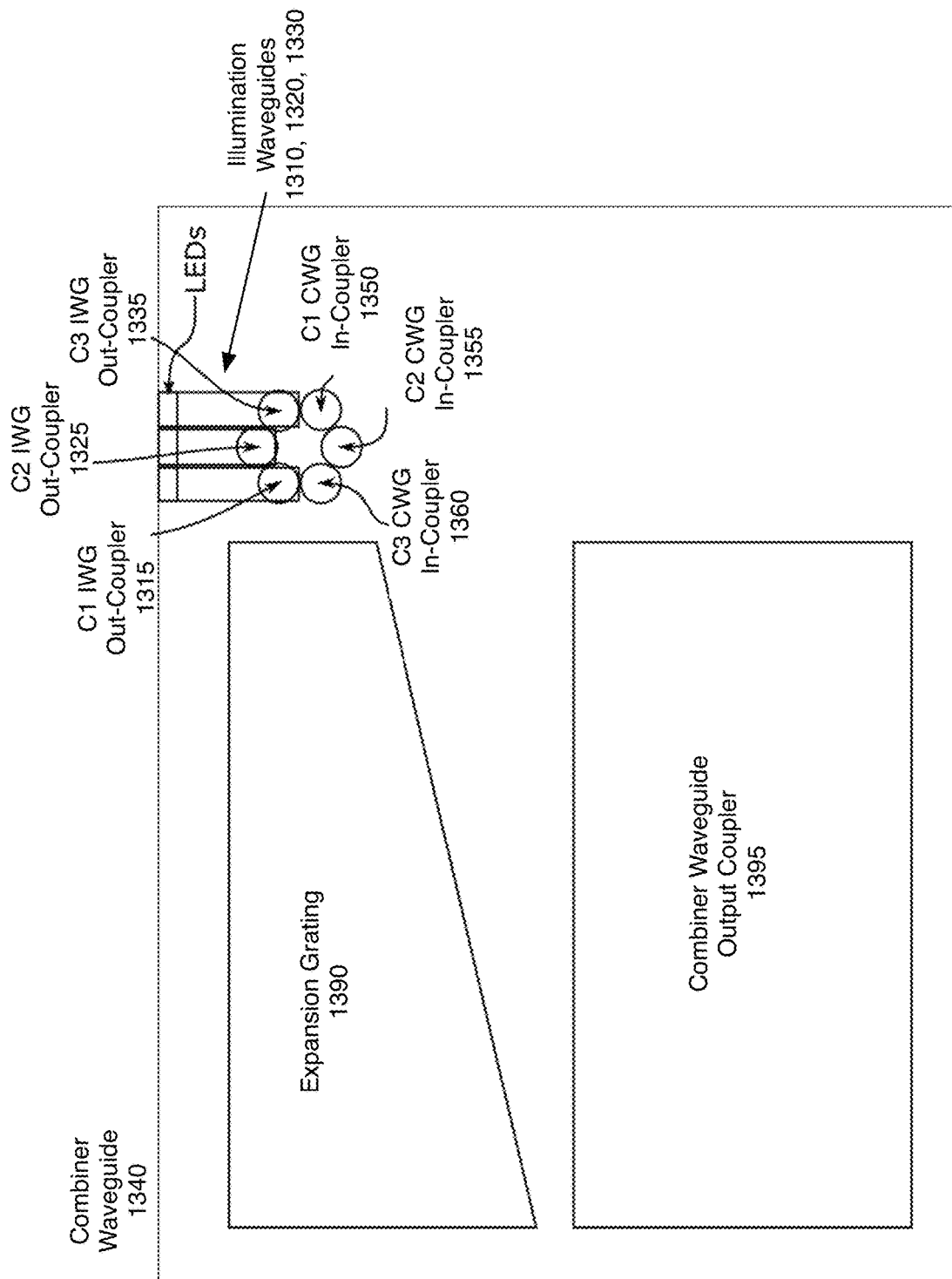
FIGS. 13A-13C illustrate different perspectives of one embodiment of a system in which each color has a separate illumination waveguide.
Figure 13B:
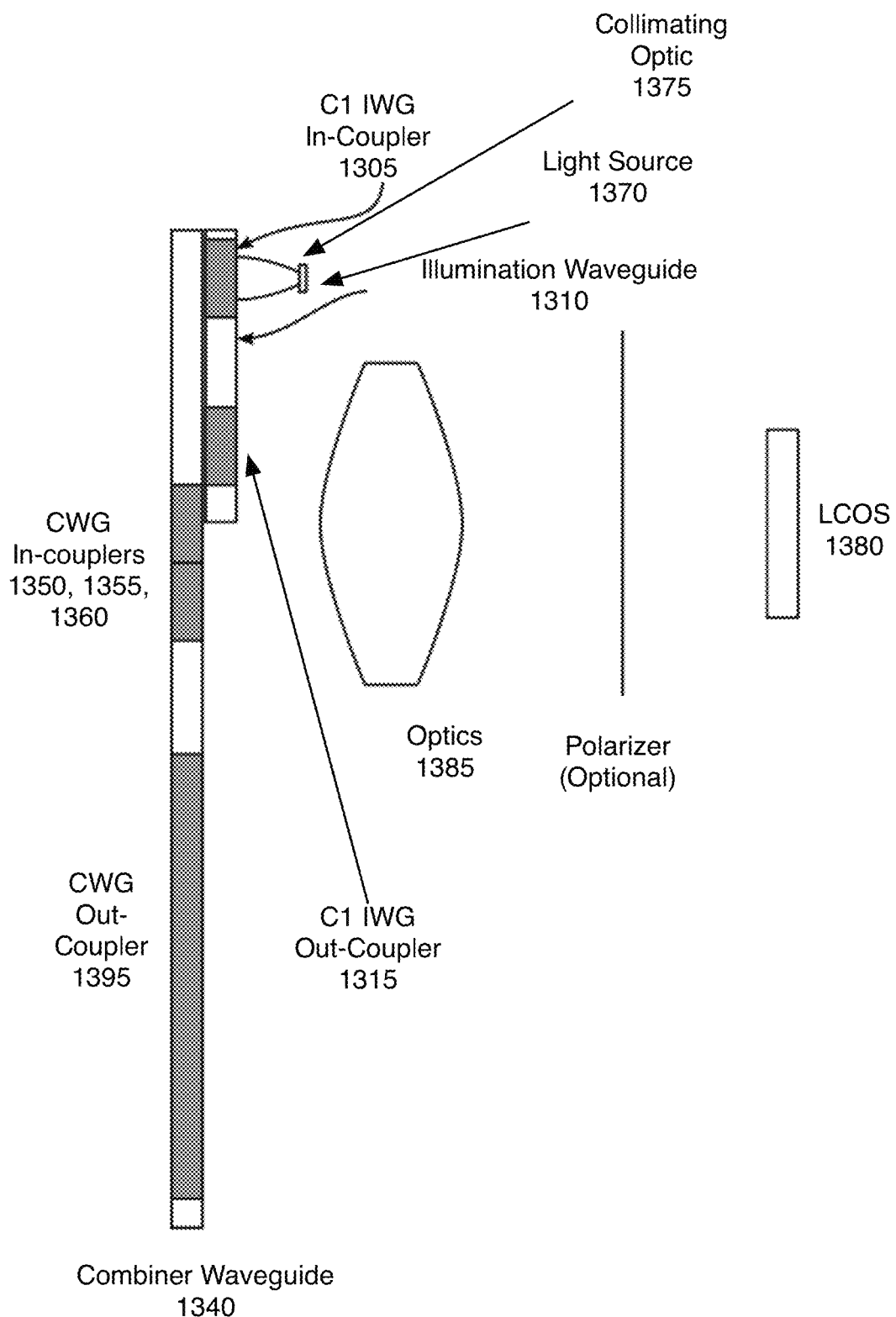
Figure 13C:
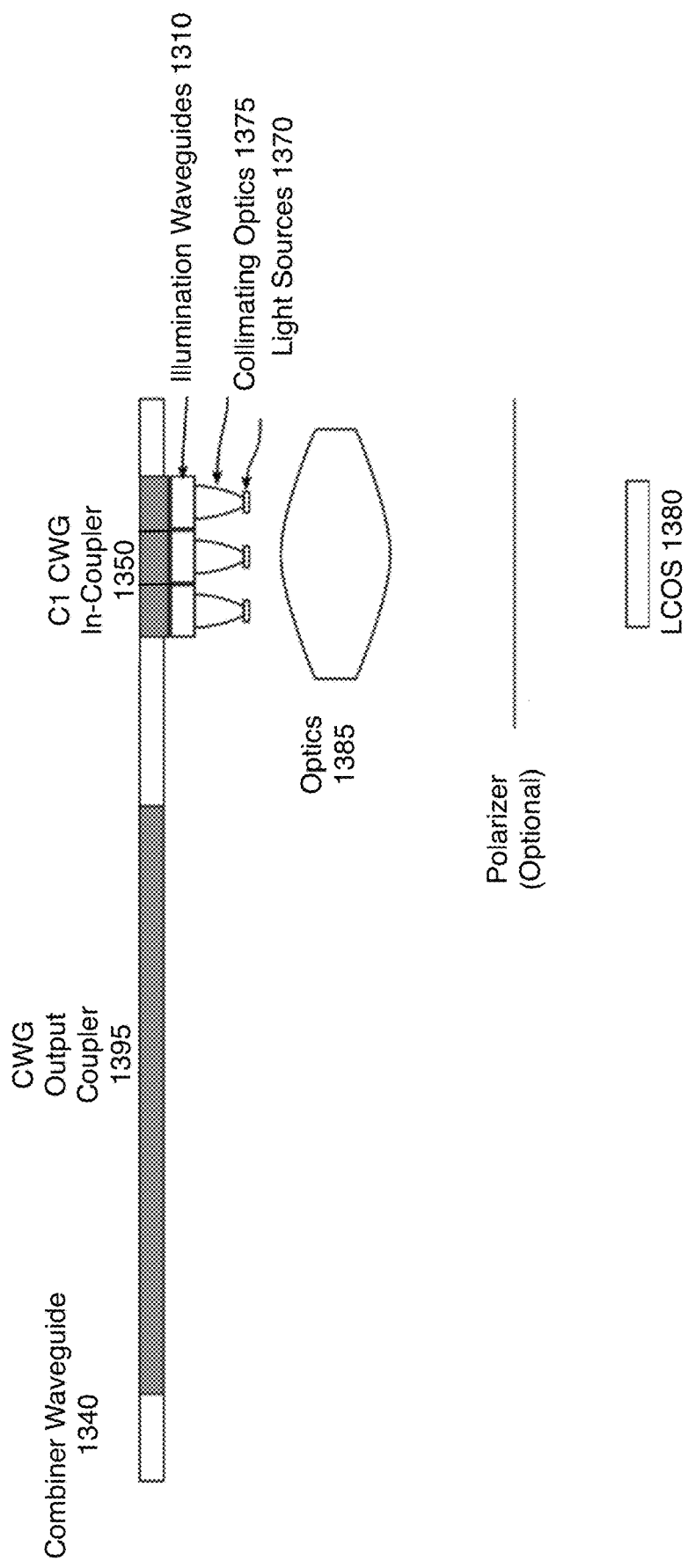

FIGS. 13A-13C illustrate different perspectives of one embodiment of a system in which each color has a separate illumination waveguide. FIG. 13A shows another view, showing the illumination waveguides 1310, 1320, 1330, each having an out-coupler 1315, 1325, 1335, arranged in a pattern. The combiner waveguide 1340 has separate in-couplers 1350, 1355, 1360 for each of the colors/illumination waveguides. In one embodiment, the arrangement of the out-couplers 1315, 1325, 1335 and combiner waveguide in-couplers 1350, 1355, 1360 is in a circle, with corresponding in-couplers and out-couplers aligned. The light out-coupled by illumination waveguides out-couplers 1315, 1325, 1335 is reflected by the LCOS (not shown), and then in-coupled into the combiner waveguide in-couplers 1350, 1355, 1360. In one embodiment, the expansion grating 1390 expands the light, before they are output by the combiner waveguide out-coupler 1395.

FIG. 13B illustrates a side view, showing only one of the three illumination waveguides 1310, with an associated light source 1370 and collimating optic 1375. As can be seen in this figure, the light from the LED 1370 passes through collimating optic 1375, and enters the illumination waveguide 1310 through in-coupler 1305. The out-coupler 1315 of the illumination waveguide out-couples the light toward LCOS 1380, through optics 1385. The light, modulated by LCOS 1380, passes through intermediate optics 1385, and to the in-coupler 1350 of the combiner waveguide 1340. In one embodiment, the separate illumination waveguides 1310, 1320, 1330 may be at different Z-depths.

In one embodiment, there may be separate combiner waveguides for each color. In one embodiment, the CWG in-couplers 1350, 1355, 1360 may be at different Z-depths.

FIG. 13C shows a different perspective, showing the three separate light sources, each with their corresponding collimation optic, and illumination waveguides. Although it appears in this figure that the LEDs are in line with the intermediate optics 1385, actually, the LEDs would be removed in the Z-axis (into or out of the paper).

Figure 13D:
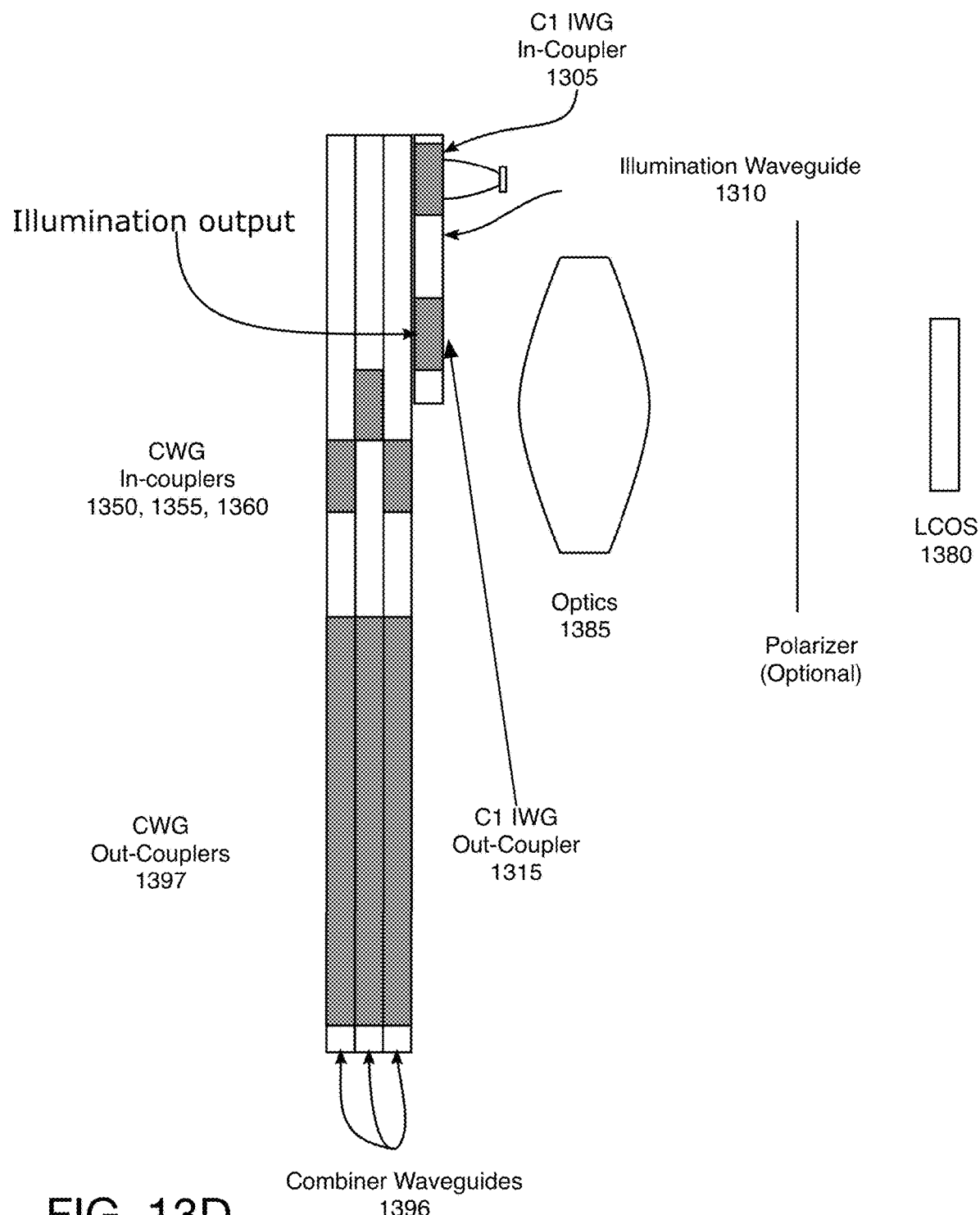
FIG. 13D illustrates one embodiment of the system in which each color has a separate combiner waveguide.

FIG. 13D shows an alternative embodiment in which there are separate combiner waveguides 1396 for each of the colors. In one embodiment, the combiner waveguides 1396 are stacked on each other, with the CWG in-couplers 1350, 1355, 1360 displaced from each other in a pattern corresponding to the displacement of the illumination waveguides' displacement. Although they are shown in the drawing as overlapping, the CWG in-couplers 1350, 1355, 1360 are displaced from each other.

Figure 14A:
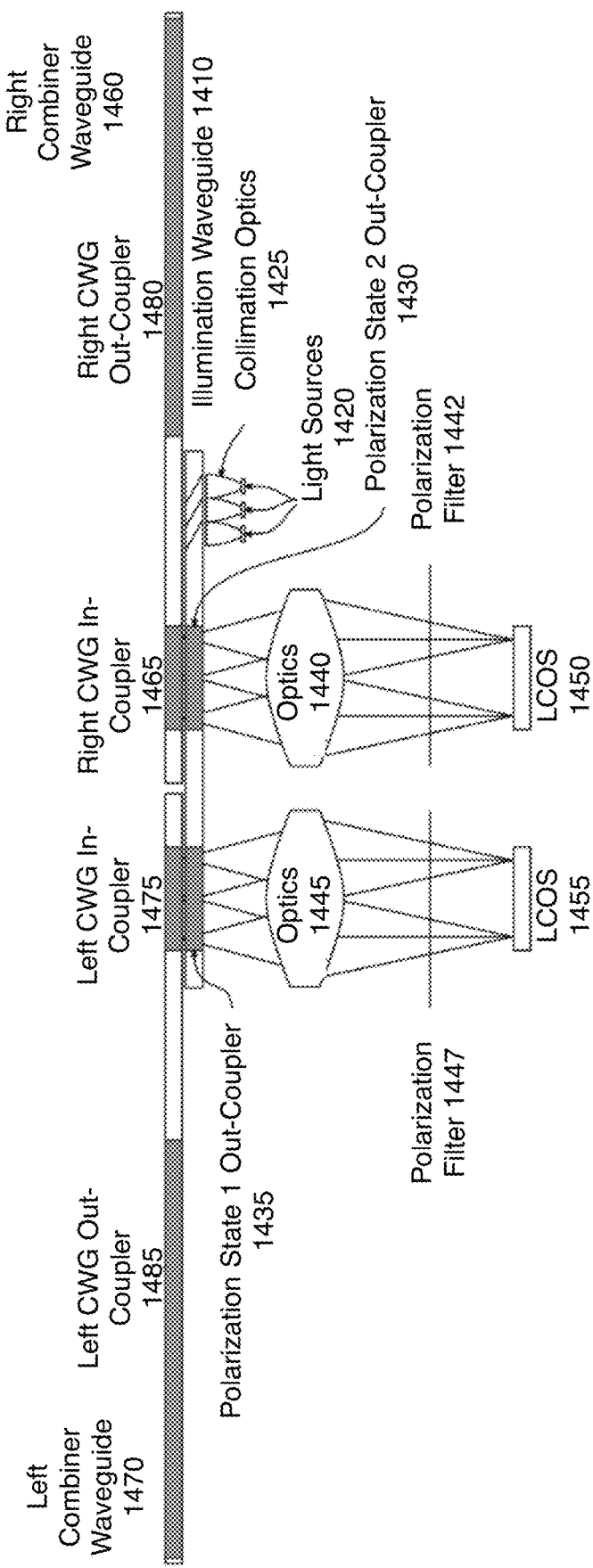
FIGS. 14A-14B illustrate one embodiment of the waveguide system for binocular display.
Figure 14B:
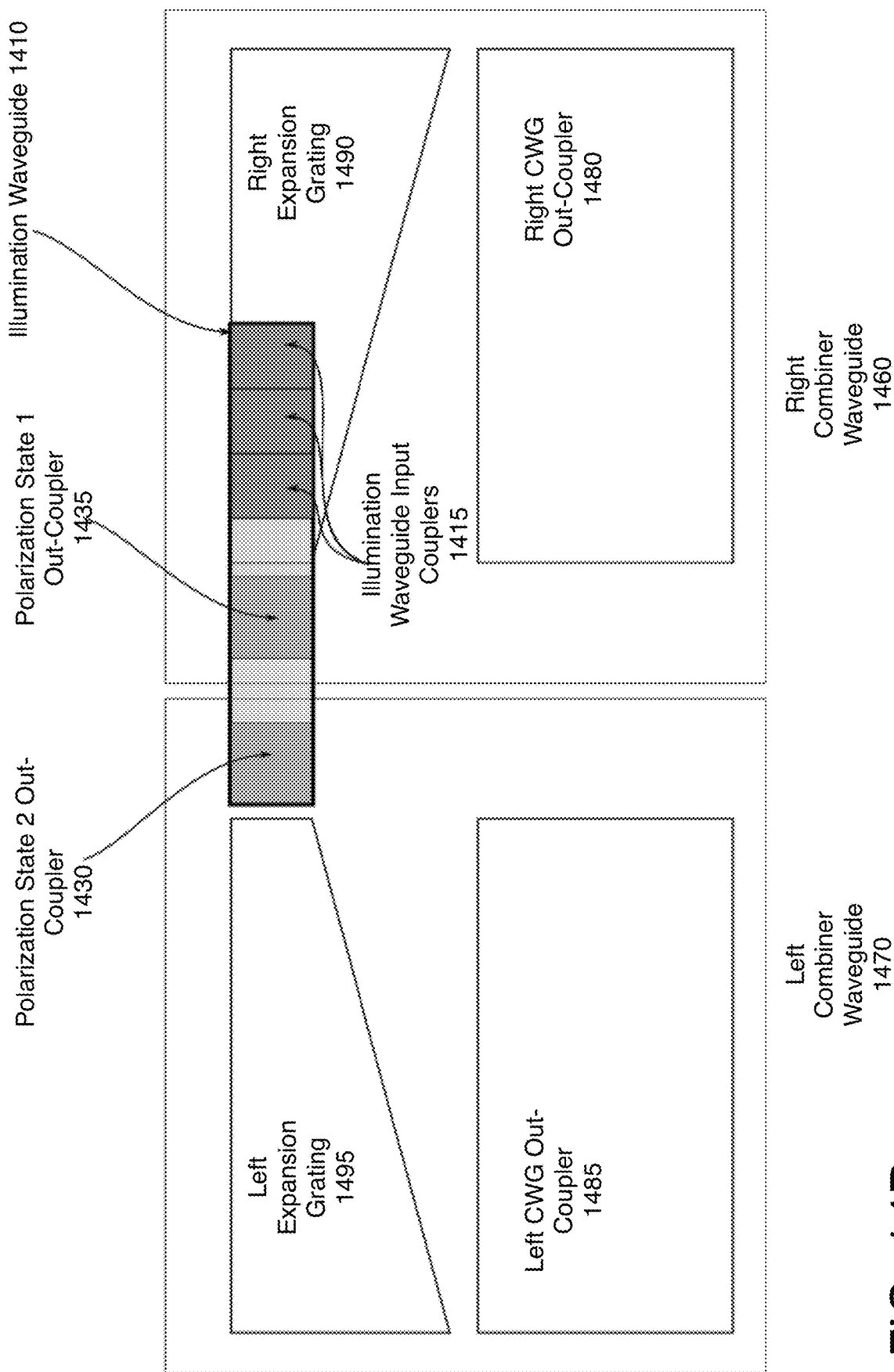

FIGS. 14A-14B illustrate one embodiment of the waveguide system for binocular display. Although, in general, all of the designs are intended for binocular use, in the embodiment shown in FIGS. 14A-14B, the binocular design utilizes a single illumination waveguide 1410. In this embodiment, the illumination waveguide 1410 includes light sources 1420, and the light in one embodiment enters the illumination waveguide 1410 through collimation optics 1425. The illumination waveguide 1410 includes two out-couplers 1430, 1435, with light having a first polarization out coupled through a first out-coupler 1435, and light having a second polarization out-coupled through a second out-coupler 1430.

Each out coupler 1430, 1435 has associated intermediate optics 1440, 1445 and LCOS 1450, 1455. In one embodiment, an optional polarization filter 1447, 1442 may be positioned between the optics 1440, 1445 and LCOS 1450, 1455 or between the out-coupler 1430, 1435 and the optics 1440, 1445 or between out-coupler 1430, 1435 and in-coupler 1465, 1475. The light returning from the LCOS 1450, 1455, is directed back through optics 1440, 1445 into the appropriate one of the combiner waveguides 1460, 1470 through respective in-couplers 1465, 1475. FIG. 14B is another view of one embodiment of the binocular display shown in FIG. 14A. Although as illustrated the illumination waveguide 1410 appears to overlap the right expansion grating 1490, the two are displaced along the Z axis, so the illumination waveguide is above or below the combiner waveguides 1460, 1470.

Figure 15:
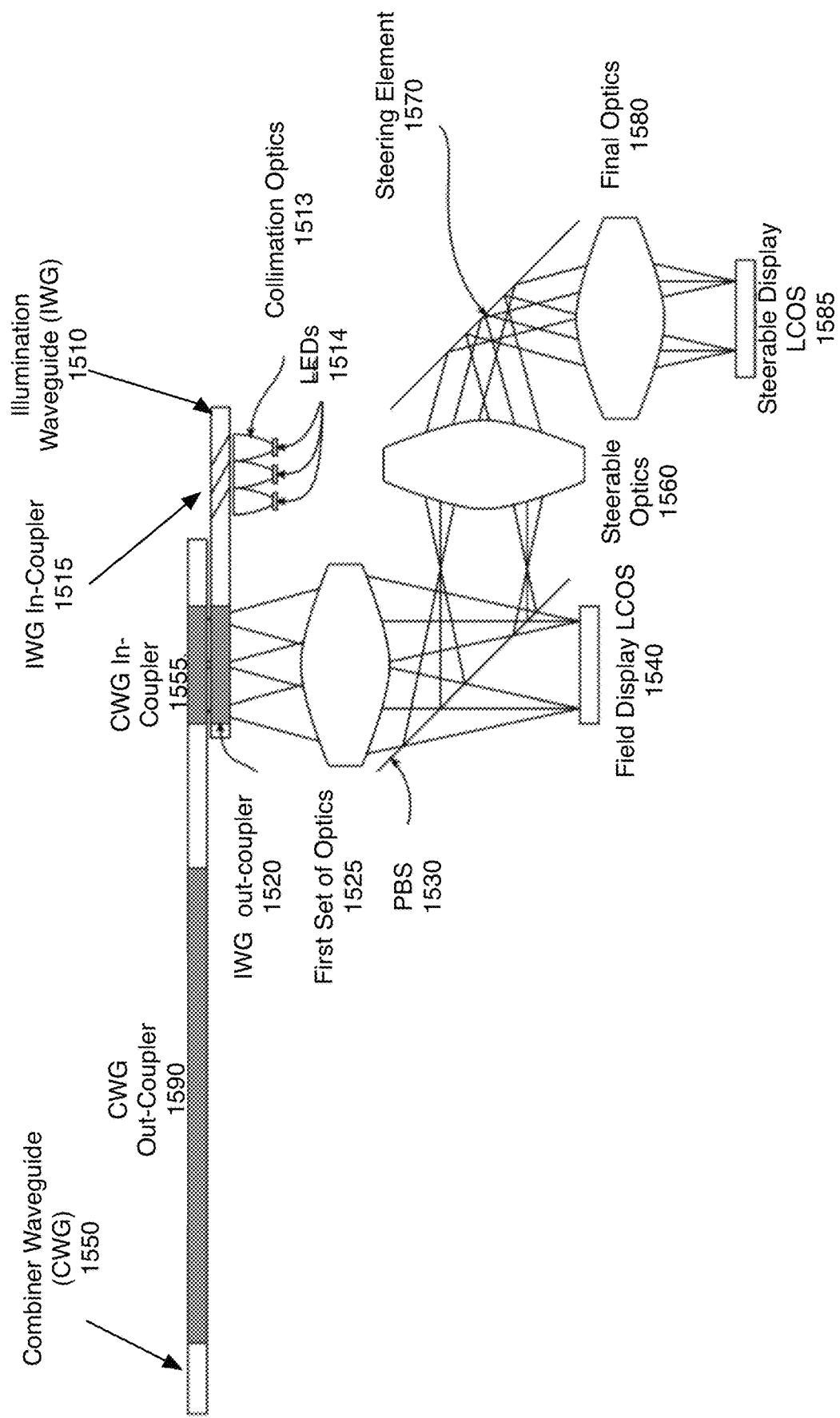
FIG. 15 illustrates one embodiment of the waveguides used with a steerable display.

FIG. 15 illustrates one embodiment of the waveguides used with a movable display. A moveable display utilizes a steering element to position an image for the user within a viewing area. In one embodiment, the steerable display is displayed in combination with a fixed display, also referred to as a field display. In one embodiment the steering element is a mirror. The positioning, in some embodiments, may be to place the high resolution steerable image centered to the user's fovea. In one embodiment, the moveable display includes two display portions, a steerable display, with a first resolution, and a non-steerable or field display with a second, lower, resolution but with a larger field of view. In one embodiment, the system utilizes the steerable display and field display of U.S. Pat. No. 10,514,546, entitled "Steerable High-Resolution Display", and incorporated herein by reference in its entirety.

The illumination waveguide 1510 receives the light from the light sources 1514, through in-coupler 1515. The out-coupler 1520 of the illumination waveguide 1510 directs the light through a first set of optics 1525. In one embodiment, the out-coupler 1520 of the illumination waveguide 1510 is not polarization selective, because light of both polarizations are used in this design. A polarizing beam splitter (PBS) 1530 splits the light, so that light with a first polarization continues to the field display LCOS 1540, and light with a second polarization is reflected to steerable optics 1560. The light from the field display LCOS 1540 is directed back from the field display LCOS 1540 through the PBS 1530 to the in-coupler 1555 of the combiner waveguide 1550.

The light that was reflected by PBS 1530 to steerable optics 1560 is directed to steering element 1570. Steering element 1570 positions the light for the image portion to the appropriate location for output, and passes it through final optics 1580 to steerable display LCOS 1585. The light returned from the steerable display LCOS 1585 is again reflected by the steering element 1570, passes through steerable optics 1560, and is reflected by PBS 1530 through the first set of optics 1525, before entering the in-coupler 1555 of the combiner waveguide 1550. In this way, the combiner waveguide 1550 receives both the field image and a steerable image, for output to the user. Because the light is reflected by the steering mirror 1570 twice, the position of the steering mirror 1570 takes into account the two changes in position, so that the final position reflects the selected destination for the moveable image.

In one embodiment, instead of having a combined image including both a field display and a steerable display, the system may include only a steerable display. In such a configuration, PBS 1530, steering optics 1560, and field display LCOS 1540 may be removed. Thus, in this configuration, the image from IWG out-coupler 1520 passes through a first set of optics to the steering element, to a steerable display LCOS 1585, and returns. In some embodiments, another one of the optics 1525, 1580 may also be removed. In one embodiment, in such a configuration a polarization filter may be placed before or after the first set of optics 1525.

Figure 16:
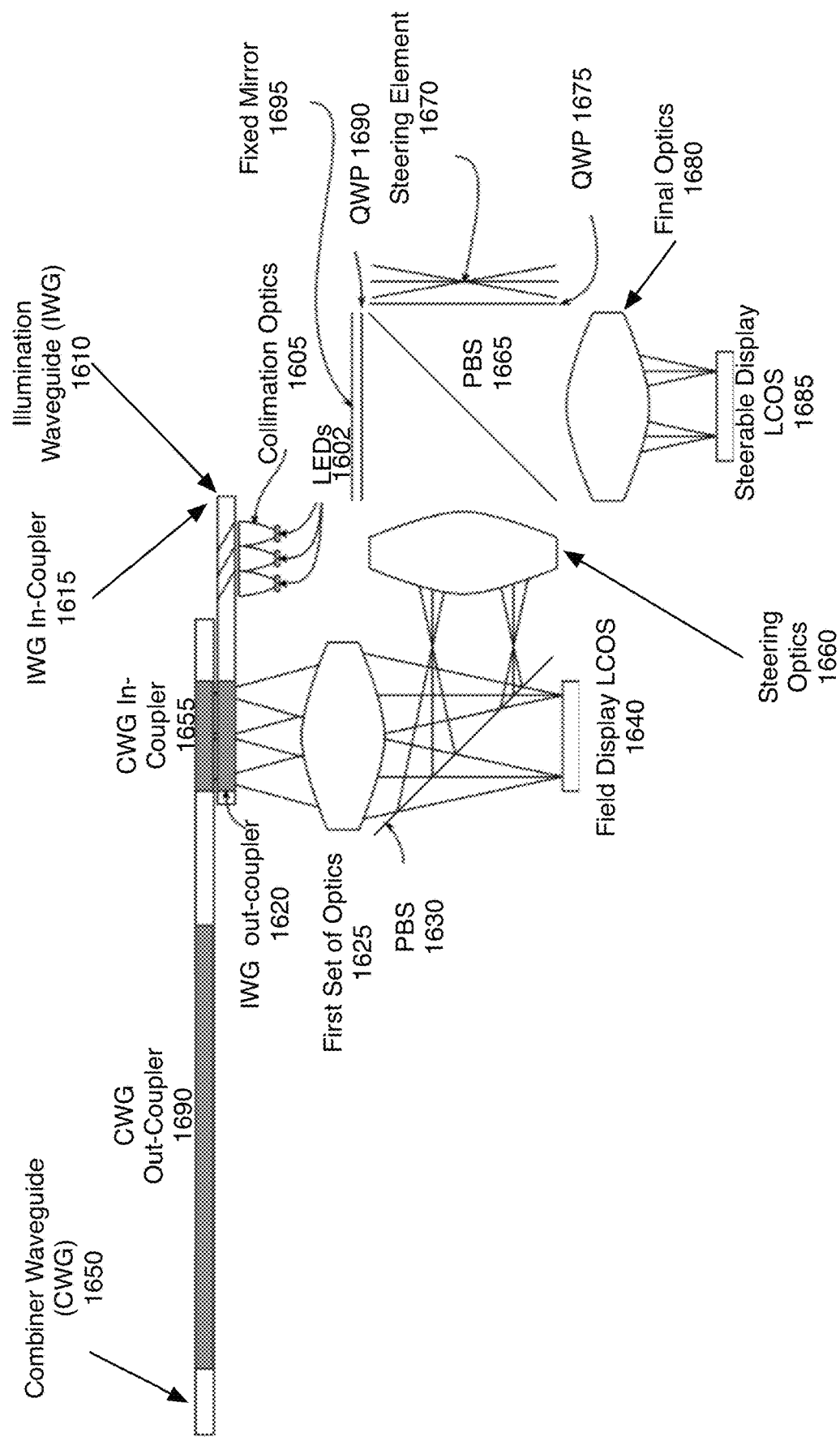
FIG. 16 illustrates another embodiment of the waveguides used with a field display and steerable display.

FIG. 16 illustrates another embodiment of the field display and steerable display. In this configuration, the light is reflected from steering element 1670 only once. The light from the out-coupler 1620 of the illumination waveguide 1610 passes through a first set of optics 1625, and is split by PBS 1630 toward field display LCOS 1640 or steerable display LCOS 1685.

The light split toward the steerable display LOCS 1685 passes through steering optics 1660. The light from the steering optics 1660 is reflected by PBS 1665 to fixed mirror 1695, passing twice through quarter wave plate 1690. It then passes through PBS 1665 to steerable display LCOS 1685. The light from steerable display LCOS 1685 is reflected by PBS 1665, through quarter wave plate 1675, and is reflected by steering element 1670. Because it passes through the quarter wave plate 1675 twice, the light is then passed through PBS 1665 back to steering optics 1660, and from there via the PBS 1630 and the first set of optics 1625 to the in-coupler 1655 of the combiner waveguide 1650. In this configuration, if the system includes only the steerable display portion, the first PBS 1630, field display LCOS 1640, and steering optics 1660 may be removed. In one embodiment, in such a configuration a polarization filter may be placed before or after the first set of optics 1625.

Figure 17:
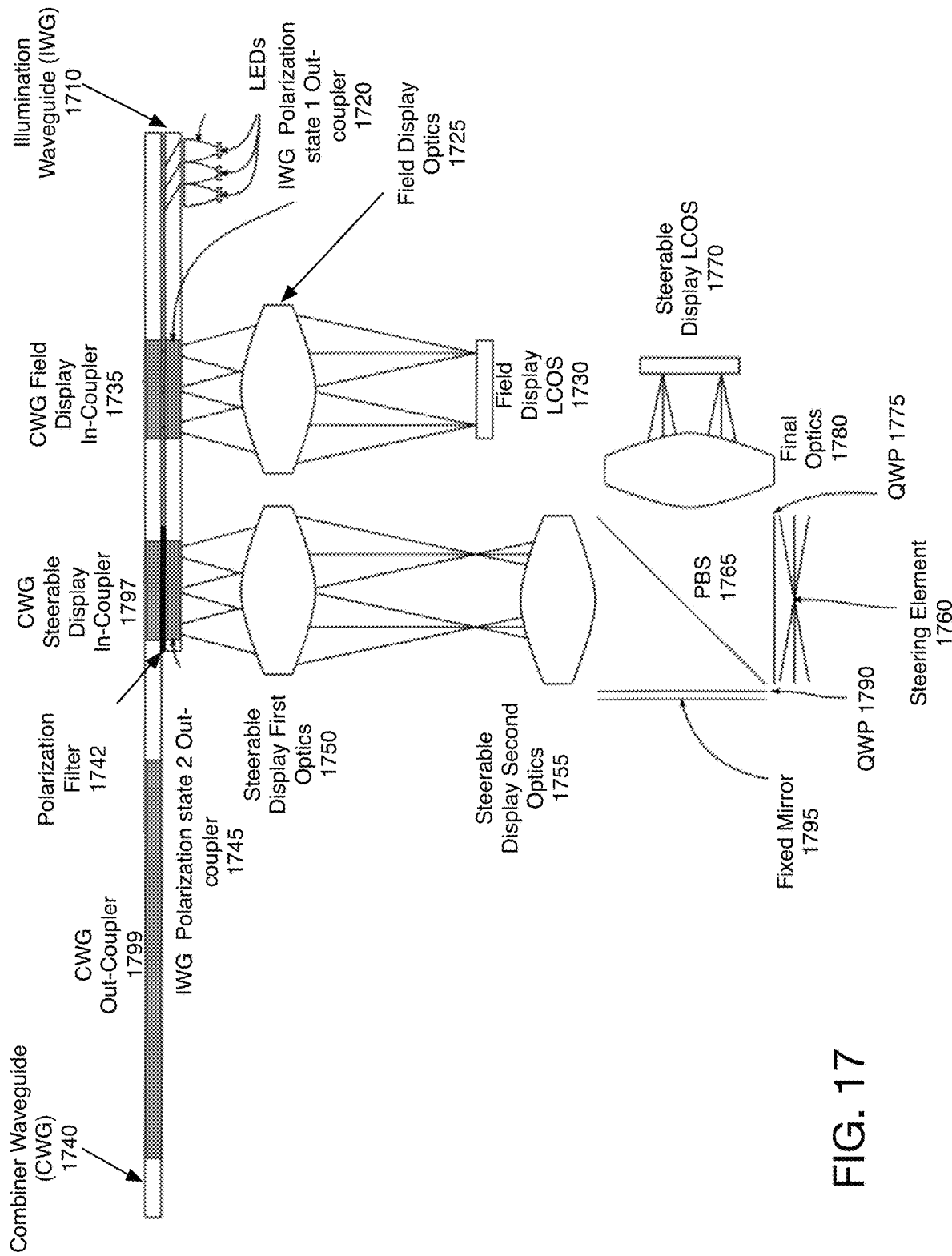
FIG. 17 illustrates one embodiment of using polarization-selective out-coupling and in-coupling to separate the light for the field display and the steerable display.

FIG. 17 illustrates one embodiment of using polarization-selective out-coupling and in-coupling to separate the light for the field image and the steerable image with separate out-coupler. The illumination waveguide 1710 includes two out-couplers 1720, 1745, one for each polarization state. The first polarization state is output through the first out-coupler 1720, passes through field display optics 1725, and is reflected from field display LCOS 1730, to the field display in-coupler 1735 of the combiner waveguide 1740.

The light with the second polarization state is output through the second illumination waveguide out-coupler 1745. The light, in one embodiment, then passes through first steerable display optics 1750, and second steerable display optics 1755, and is reflected from steering element 1760, to LCOS 1770. This embodiment shows the steering element 1760 paired with a fixed mirror 1795 and two quarter-wave-plates 1790, 1775 with a PBS 1765. The other configuration for the steering mirror use, shown in FIG. 15, may also be used here. In one embodiment, a polarization filter 1742 is positioned before the steerable display in-coupler 1797, to remove stray light. The light passes through polarization filter 1742 after it is modulated by LCOS 1770, before it enters the combiner waveguide 1740.

Figure 18A:
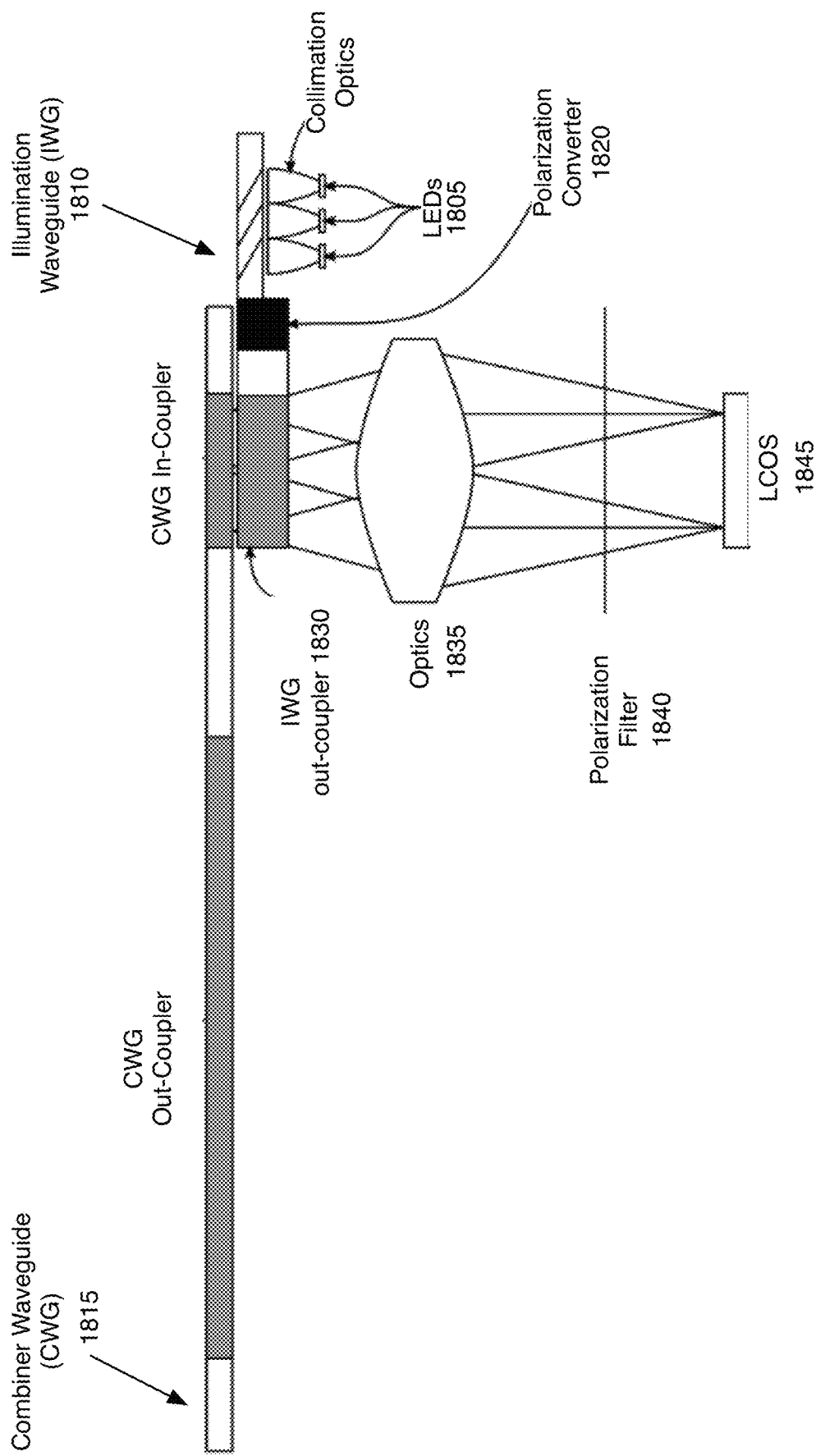
FIG. 18A shows a side view of an illumination waveguide including a polarization converter in one embodiment.

FIG. 18A shows a side view of an illumination waveguide including a polarization converter in one embodiment. The illumination waveguide 1810 has in-couplers, for the light from LEDs 1805. The light traveling along the illumination waveguide 1810 passes through polarization converter 1820, prior to reaching out-coupler 1830. The out-coupler 1830 guides the light through optics 1835, and optionally polarization filter 1840, to LCOS 1845. The modulated light from LCOS 1845 passes through polarization filter 1840, optics 1835, to the combiner waveguide 1815's in-coupler. The use of polarization converter 1820 ensures that all of the light in the waveguide has the same polarization state.

Figure 18B:
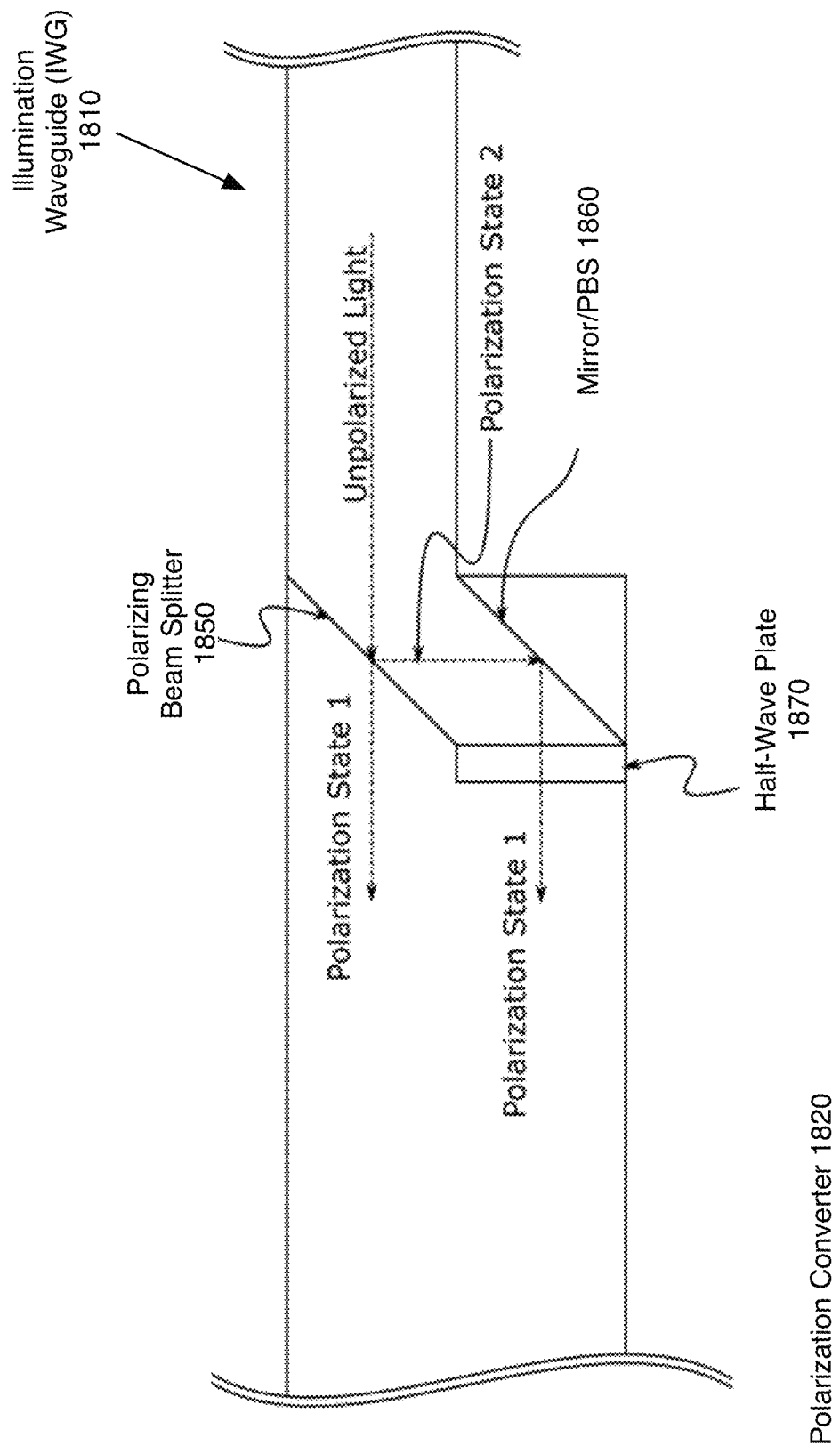
FIG. 18B illustrates one embodiment of the polarization converter of the illumination waveguide of FIG. 18A.

FIG. 18B illustrates one embodiment of the polarization converter 1820 of the FIG. 18A. The polarization converter 1820 includes a polarizing beam splitter 1850 across the waveguide 1810. The portion of the light that is in polarization state 1 passes through the PBS 1850. The portion that is in polarization state 2 is reflected to mirror 1860, or a second PBS. Mirror 1860 reflects the light, which passes through a half-wave plate 1870. The half-wave plate alters the polarization of the light, so the light in the waveguide is all of polarization state 1. In this way, all of the light in the illumination waveguide 1810, after the polarization converter 1820, is polarization state 1.

This requires an illumination waveguide having two thicknesses. This type of polarization recapture may be utilized in any of the designs above which do not use light separation based on polarization states.

Figure 19:
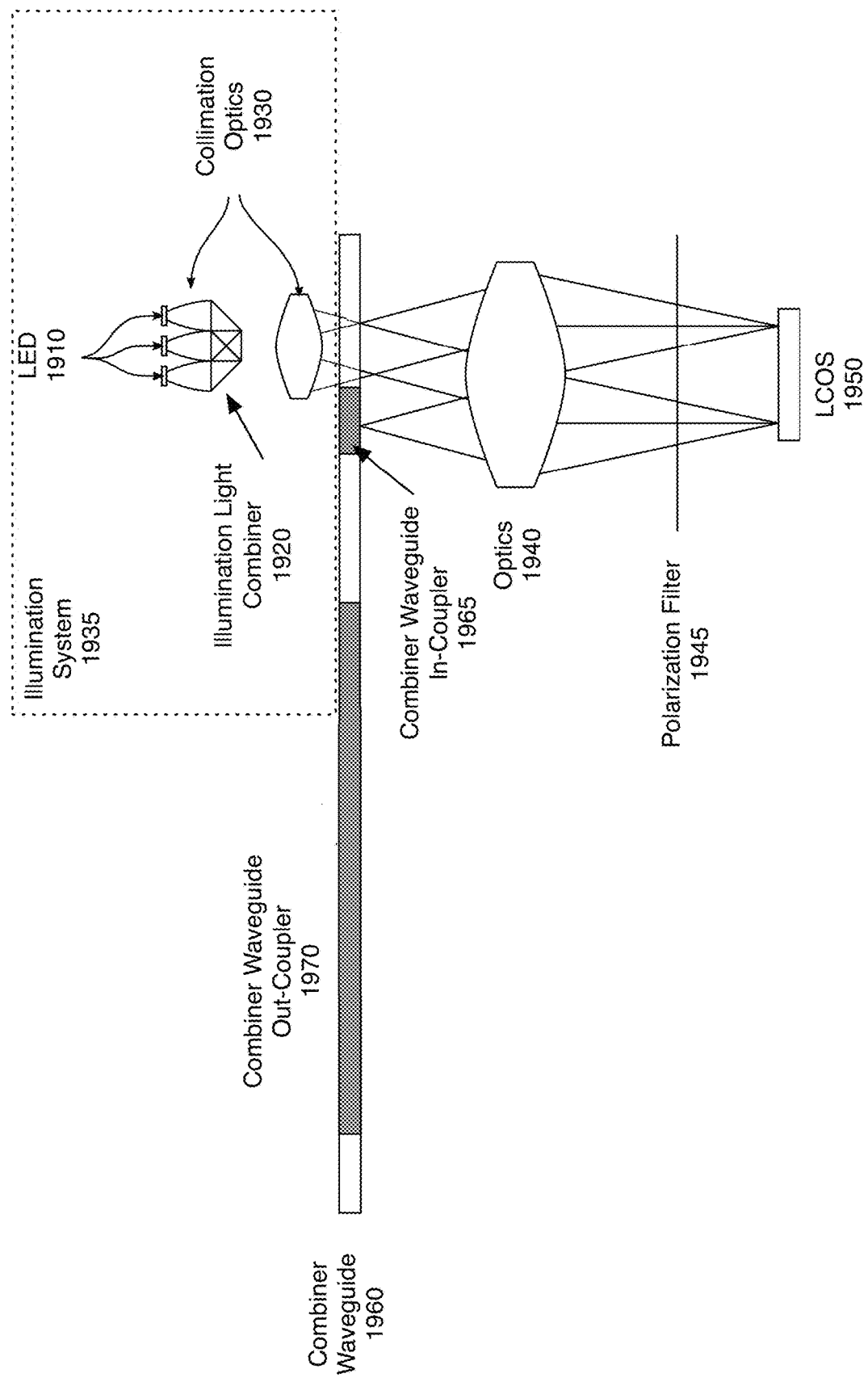
FIG. 19 illustrates one embodiment of the system using a light combiner as an illumination system.

FIG. 19 illustrates one embodiment of the system with non-waveguide illumination system. The light from LEDs 1910 passes through collimation optics 1930, and is combined by light combiner 1920. In one embodiment, illumination light combiner 1920 is an X-cube prism, or illumination prism. Other types of illumination light combiners may be used. The output of the light combiner 1920 goes through a second part of collimation optics 1930, in one embodiment. The LEDs 1910, illumination light combiner 1920 and collimation optics 1930 together are the illumination system 1935.

The output of the second part of the collimation optics 1930, in one embodiment, passes through combiner waveguide 1960. It then passes through projection optics 1940, and optionally polarization filter 1945, to LCOS 1950. The light modulated by LCOS 1950 passes back through projection optics 1940, and enters the combiner waveguide in-coupler 1965. As can be seen, in this embodiment, the light passes through the projection optics 1940 from the illumination system 1935 to the LCOS 1950, and from the LCOS 1950 to the combiner waveguide in-coupler 1965.

Figure 20:
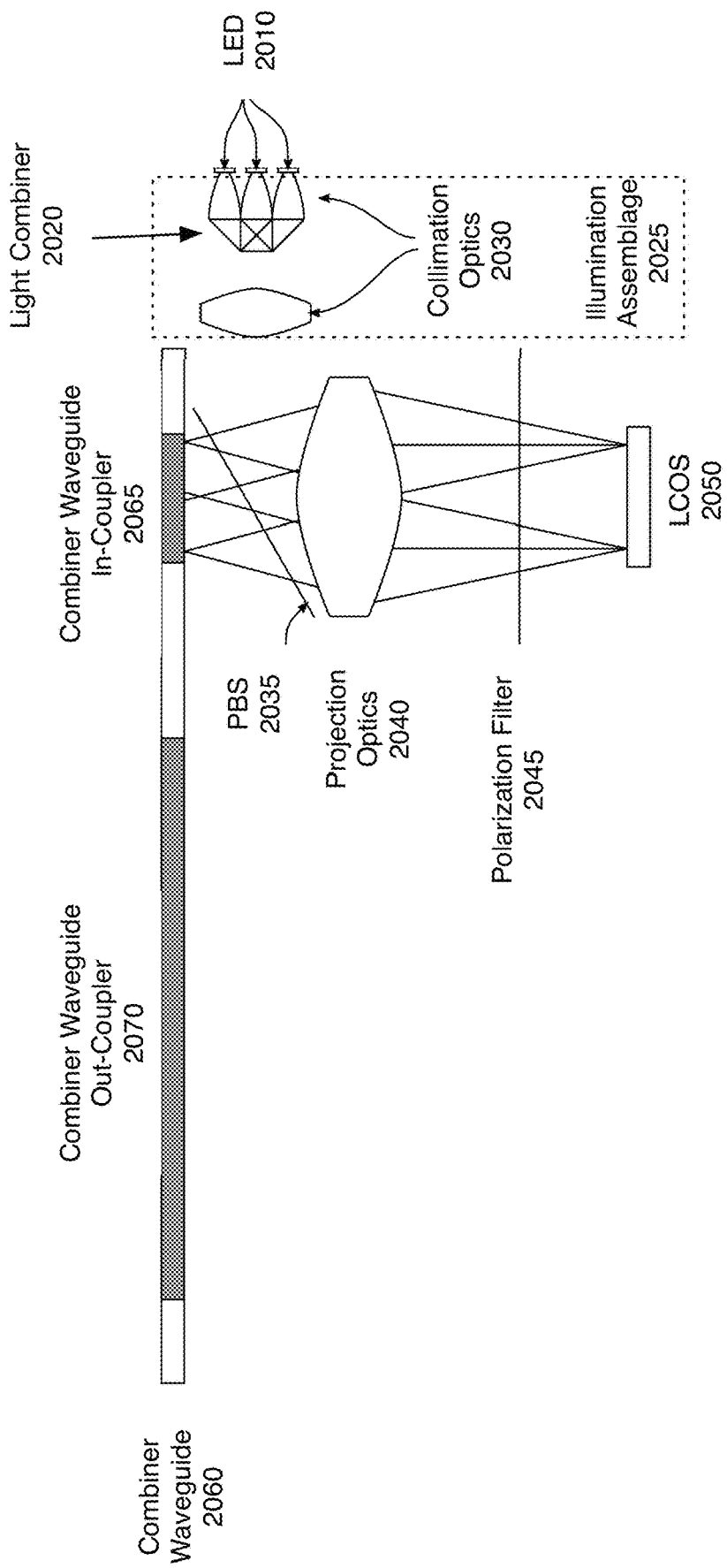
FIG. 20 illustrates another embodiment of the system using a light combiner as an illumination system.

FIG. 20 illustrates another embodiment of the system with non-waveguide illumination system. The illumination system 2025 include collimation optics 2030 and a light combiner 2020. The output of the illumination system 2025 is reflected by a PBS 2035, and passes through projection optics 2040. The light passes through an optional polarization filter 2045, before impacting LCOS 2050. The light modulated by LCOS 2050 passes through optics 2040, and through PBS 2035 before entering the combiner waveguide 2060 in-coupler 2065.

Figure 21A:
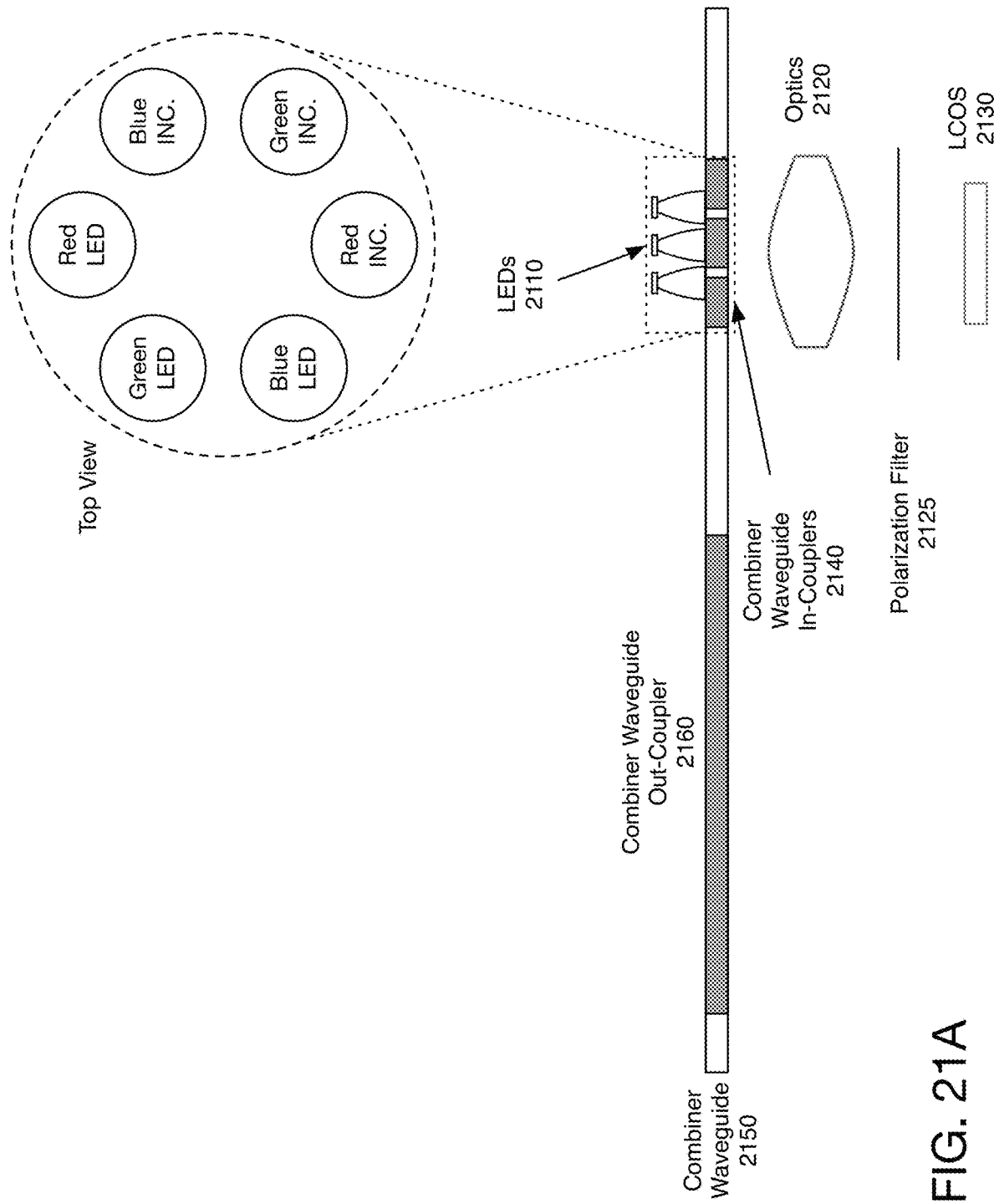
FIG. 21A illustrates one embodiment of a combiner waveguide with separate lights and in-couplers for each of the colors.

FIG. 21A illustrates one embodiment of a combiner waveguide with separate lights and in-couplers for each of the colors. The LEDs 2110 pass through the combiner waveguide 2150, through optics 2120, optional polarization filter 2125, to LCOS 2130. The modulated light from LCOS 2130 passes through optics 2120, before entering the combiner waveguide in-couplers 2140. In one embodiment, the LEDs 2110 are color separated, and matched to their respective in-coupler 2140 for each of the colors. The combiner waveguide 2150 guides the light through, and outputs it through combiner waveguide out-coupler 2160. The other view shown illustrates one embodiment of the configuration of the lights and in-couplers. Of course, other arrangements may be used, as long as the system enables the light from each LED to be in-coupled to the appropriate in-coupler, after passing through optics 2120 twice, and being modulated by LCOS 2130.

Figure 21B:
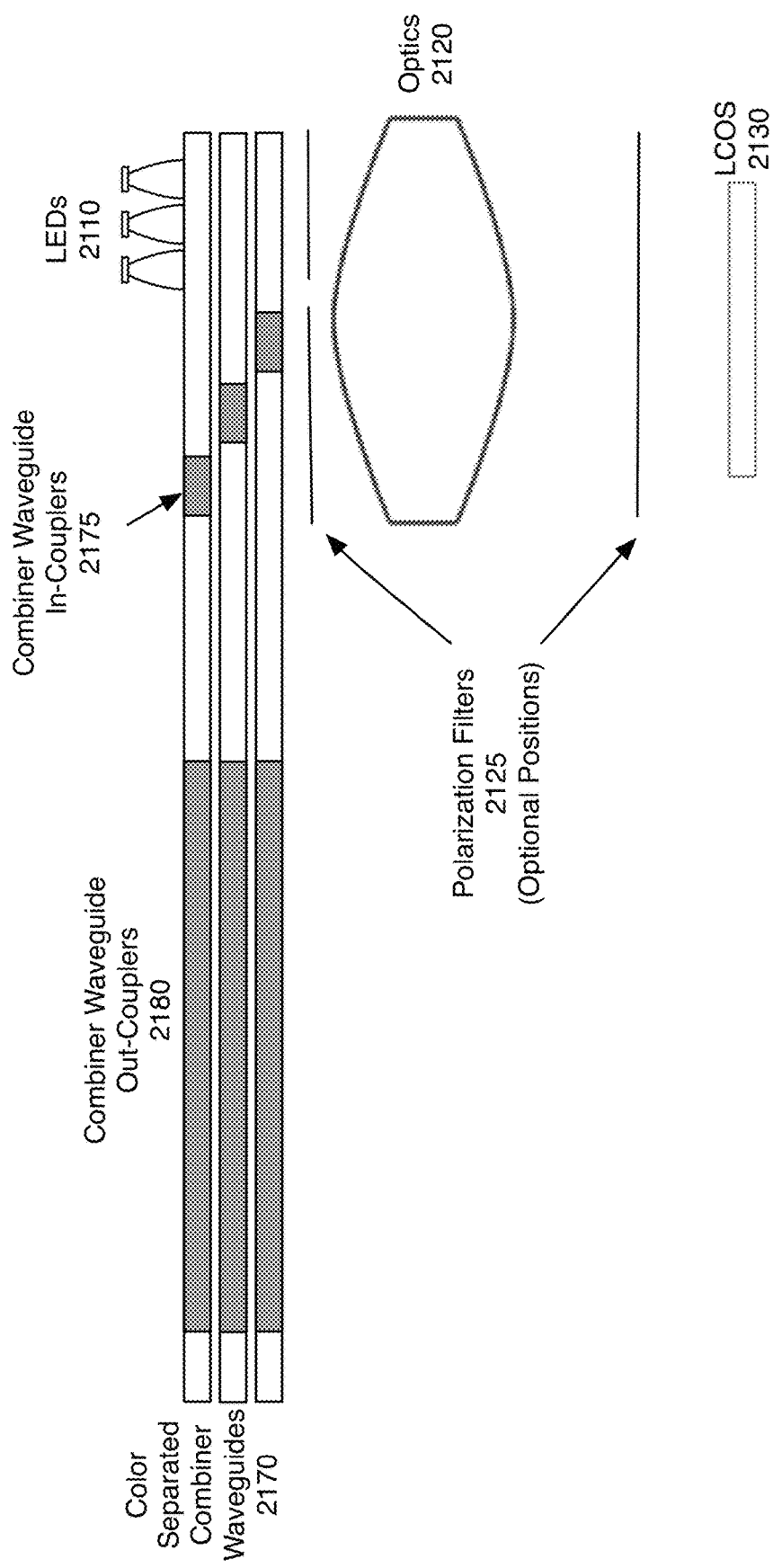
FIG. 21B illustrates one embodiment of color-separated combiner waveguides.

FIG. 21B illustrates one embodiment of color separated combiner waveguides. The LED light sources 2110 pass through the color separated combiner waveguides 2170, to optics 2120, to be modulated by LCOS 2130. The polarization filters 2125 may be positioned between the waveguides 2170 and the optics 2120, or between optics 2120 and LCOS 2130. The illustration shows the combiner waveguide in-couplers 2175 displaced along the X-axis, but as shown in FIG. 21A, the displacement maybe along two axes. The combiner wave out-couplers 2180 in one embodiment are overlapping, and output the different colors.

In general, the variations between the various embodiments of the exit pupil illumination systems shown may be carried through to other configurations. For example, the illumination system may be the illumination waveguide or the collimation optics and light combiner in any of the waveguides. The optical power applied to the illumination waveguide out-coupler may be applied to any configuration which includes an illumination waveguide. The illumination pupil and projection pupil may be offset or overlapping in any of the configurations. A flexible portion of the illumination light guide or a turning coupler may be used for any other configuration as well. Thus, the configurations illustrated are not intended to be exclusive, but rather inclusive of the various ways in which the illumination light to the LCOS panel and the modulated light from the LCOS panel both pass through a shared subset of the optics.

Thus, the present system provides a design in which light passes through the optics from the illumination system to the LCOS, as well as from the LCOS to the in-coupler of a combiner waveguide. Thus, the optics serve a dual purpose. Additionally, in one embodiment, the light that exits the optics and lands on the LCOS also falls within the volume of the light that would form the limiting output pupil of the optics on the illumination pass. This design may be used to provide a mechanism for smart glasses, by using the combiner waveguide as part of the lens of the glasses to show content to the user. However, the relationship of the LEDs, optics, and LCOS elements need to remain unchanged. Therefore, the smart glasses designs shown below provide a mechanism to enable the light engine to remain in position which provides the wearable comfort of standard glasses, as well as the ability to close the arms of the glasses for storage.

Figure 22:
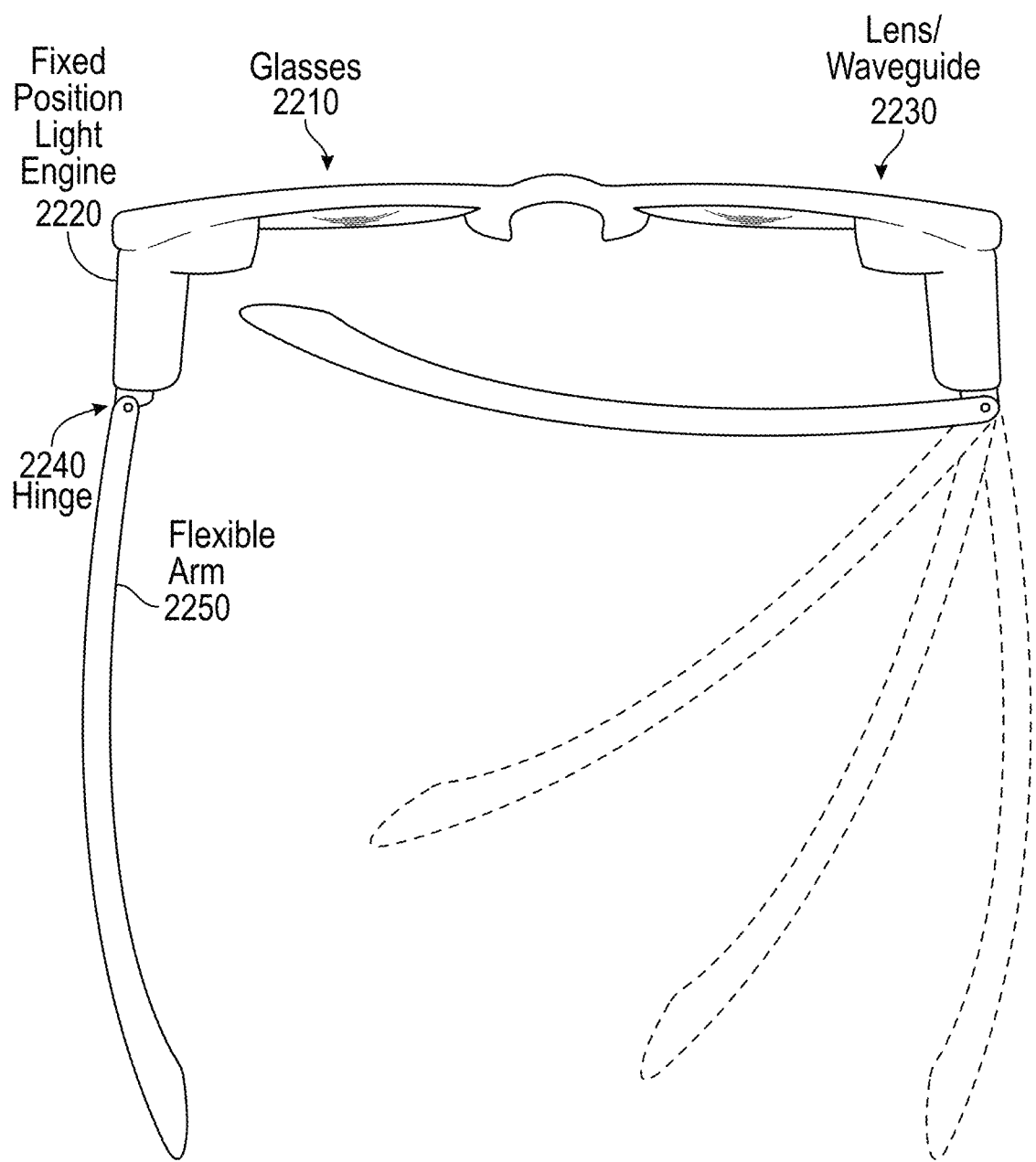
FIG. 22 is an illustration of one embodiment of smart glasses in which the waveguide display may be used.

FIG. 22 is an illustration of one embodiment of smart glasses in which the waveguide display may be used. This configuration attaches the hinge 2240 at the end of the fixed position light engine 2220. The fixed position light engine 2220 includes the elements described above, e.g., the light source, the optics, and the LCOS elements, while the lens of the glasses 2210 include the waveguide 2230 to display images to the user. By providing a fixed position light engine 2220, the present design ensures that the relationship of the elements is not altered over time, by the arms 2250 moving. Furthermore, the elements in one embodiment are protected from damage. In one embodiment, the fixed position light engine 2220 is enclosed in a solid plastic casing, to protect it and maintain the relationship between the elements. The waveguide 2230 in one embodiment is see-through enabling the system to be used for augmented reality or mixed reality glasses.

Figure 23A:
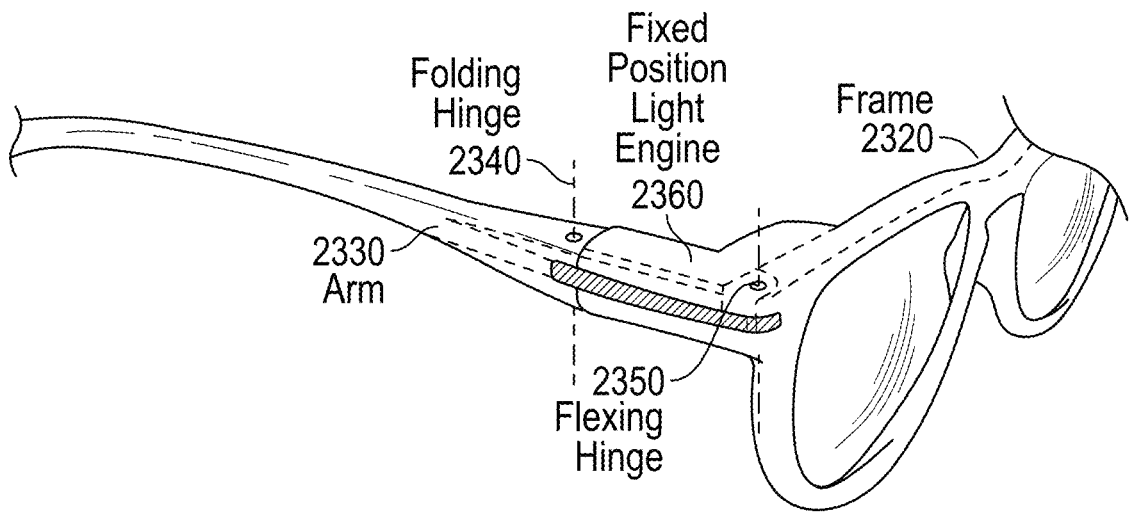
FIGS. 23A-23C illustrate one embodiment of a dual hinge system for the smart glasses.
Figure 23B:
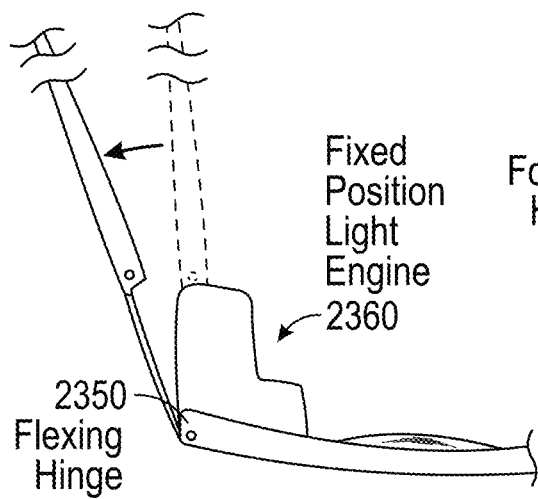
Figure 23C:
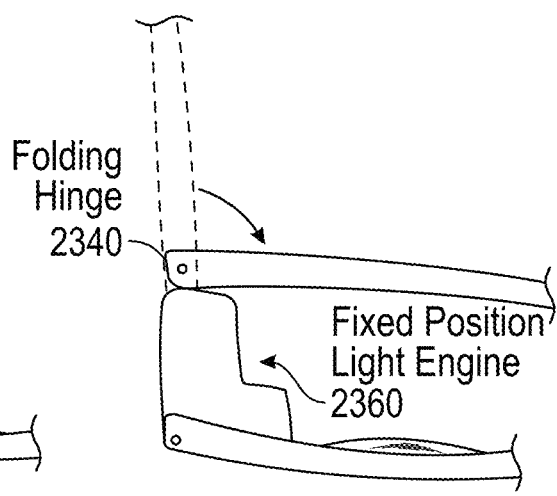

FIGS. 23A-23C illustrate one embodiment of a dual hinge system for the smart glasses. The system includes the frame 2320, and an arm 2330. The arm is attached in two locations, via a dual hinge arrangement. The attachment at the side of the glasses frame provides a flexing hinge 2350 which provides the comfort and adjustability for wear. The folding hinge 2340 attached at the bottom of the light engine 2360 provides the ability to fold the arms closed for storage.

FIGS. 24A-24C illustrate one embodiment of an arm with a cut-out. The configuration shown provides a single hinge, attached to the top of the lens rims. The hinge 2440 is positioned on the top and bottom of the fixed light engine 2460, and enables the arm 2430 to fold using a cut-out. The cut-out 2435 enables the light engine 2460 to pass through the arm 2430 when the arm is folded. In one embodiment, the arm may also include a cable routing 2470 along which a wire may be lead. This wire may be used to attach other elements of the system, or provide power, for example.

Figure 24E:
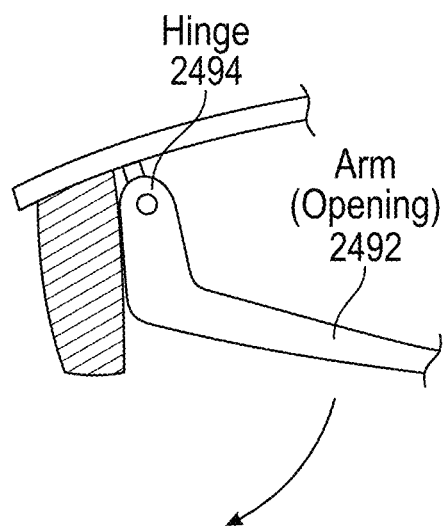
FIGS. 24E-24F illustrate one embodiment of an arm with a cut-out that has an inside hinge.
Figure 24F:
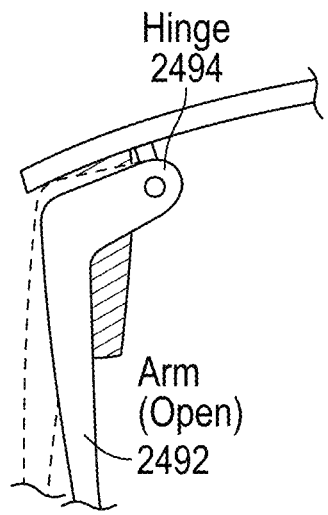

FIGS. 24D-24F illustrate another embodiment of an arm 2492 with a cut-out. In this configuration, the frame attachment point 2480 is to the lens rim above the fixed light engine 2460. The arm has a light engine protector 2490 which protects the light engine, when the arm is in the open position. When the arm is in the closed position, the light engine 2460 goes through the cut-out in the arm. This can be further seen with the arm shown in the open position in FIG. 24F and the closed position in FIG. 24E.

Figure 25A:
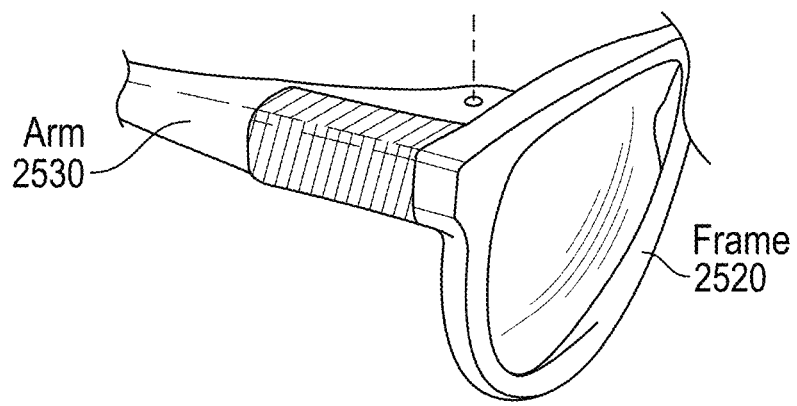
FIGS. 25A-25C illustrate another embodiment of the arm to protect the light engine.
Figure 25B:
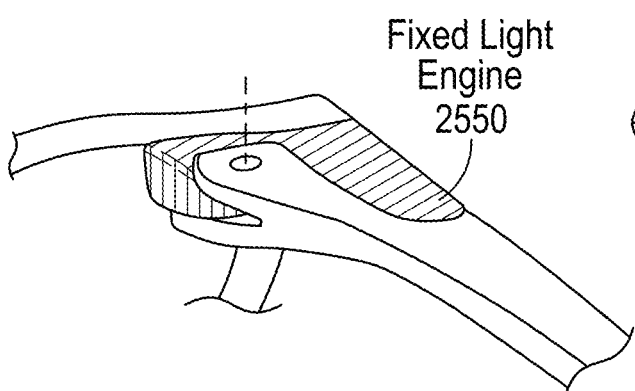
Figure 25C:
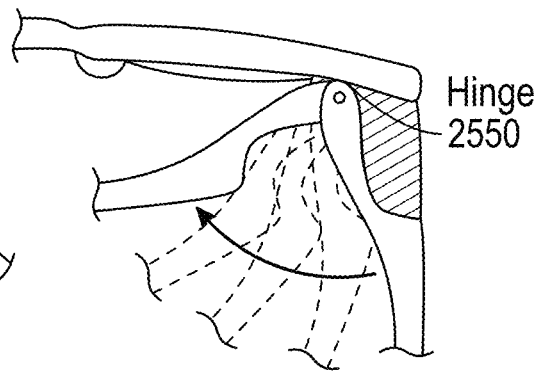

FIG. 25A illustrates another embodiment of the arm to protect the light engine. The arm has a cut-out, and a rotating hinge is attached to the light engine 2560. FIG. 25B illustrates a slightly different positioning for the hinge. FIG. 25C illustrates another position, in which the hinge 2540 is attached to the light engine. In one embodiment, in this configuration, the light engine casing is made out of a solid plastic or metal material that can support the hinge. In the configuration shown in FIG. 25B, the hinge element 2550 is split, such that support for the arm is provided on the top and bottom of the light engine 2560, rather than having a single attachment point.

Figure 26A:
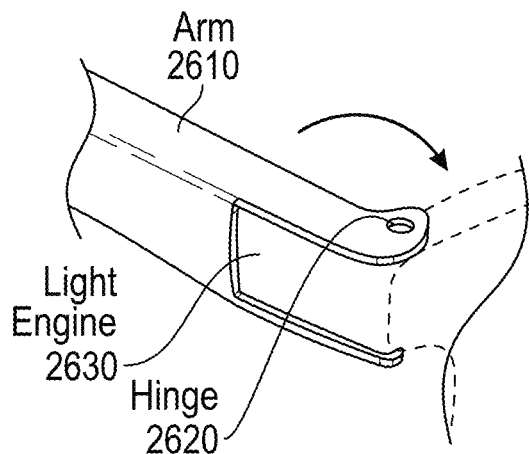
FIGS. 26A and 26B illustrate embodiments of the hinging element.
Figure 26B:
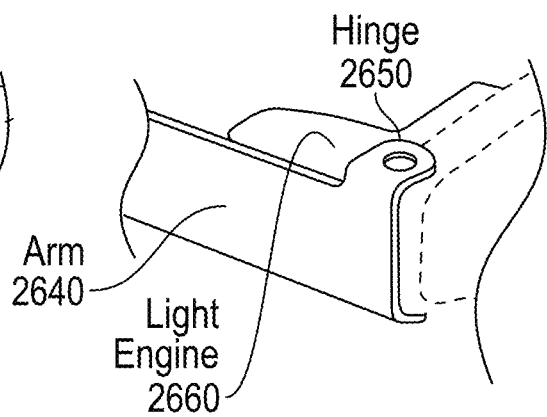
Figure 26C:
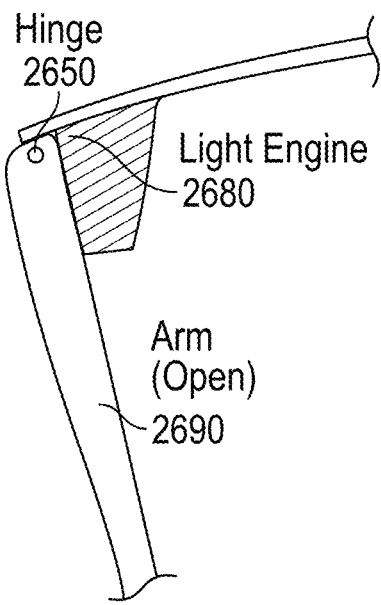
FIGS. 26C and 26D illustrate the open and closed configurations of an arm with an outside hinge.
Figure 26D:
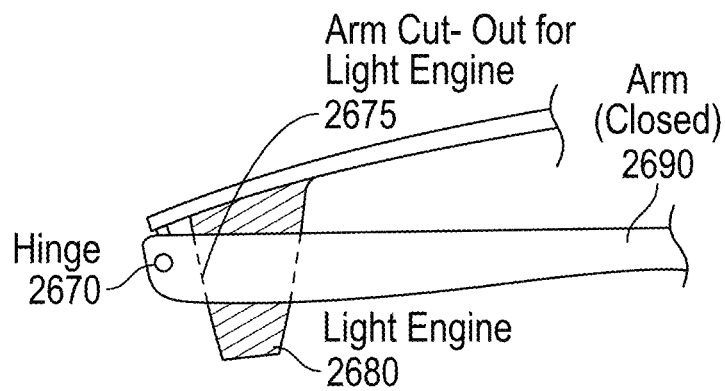

FIGS. 26A and 26B illustrate embodiments of the hinging element. The hinging element 2620, 2650 attaches at the top and bottom of the frame. In one embodiment, as shown in FIG. 26A, the arm 2610 may have a cut-out for the light engine 2630. In one embodiment, the arms may fold forward. These outside hinges in one embodiment are attached on the side of the glasses frame. As can be seen the shape of the hinge element itself may be varied. FIGS. 26C and 26D illustrate the open and closed configurations of an arm 2680, 2690 with an outside hinge 2650, 2670. The arm in one embodiment, has an arm cut-out 2675 for the light engine.

FIGS. 27A-27C illustrate one embodiment of a rotating hinge, in which the arm is rotated to open or close. A rotating hinge is configured so that it is rotated around the axis for opening and closing the arm 2730. The rotating arm 2730 is coupled to the rotating hinge 2720. The rotating hinge is in a first position when it is open, and rotated into the closed position. Thus, in this configuration there is no bending element in the hinge. Rather, the arm is rotated between the two positions. In one embodiment, a ball joint, universal joint, ball socket or another type of joint is used.

Figure 28:
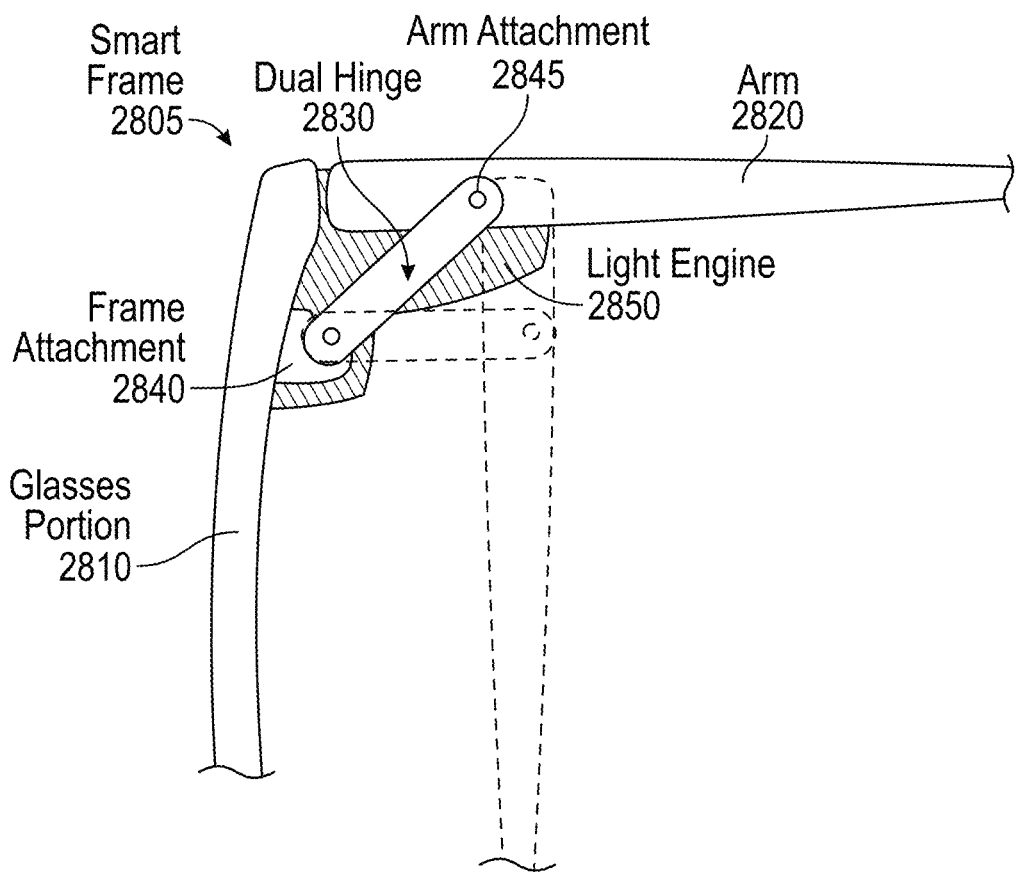
FIG. 28 illustrates one embodiment of a dual hinge.

FIG. 28 illustrates one embodiment of a dual hinge. The dual hinge 2830 is attached via a hinge connection to the frame 2805 via frame attachment 2840 as well as to the arm, via arm attachment 2845. Thus, the arm 2820 can move, without any impact on the light engine 2850.

Figure 29A:
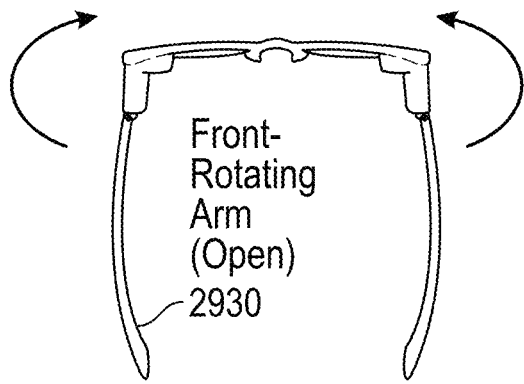
FIGS. 29A-29D illustrate one embodiment of glasses with a front rotating arm, in which the closed position has the arms in front of the lenses.
Figure 29B:
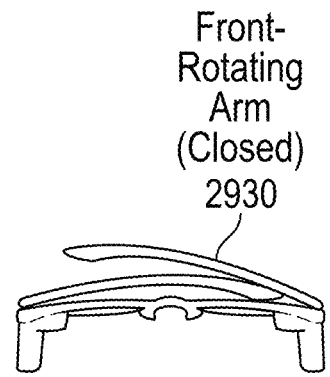
Figure 29C:
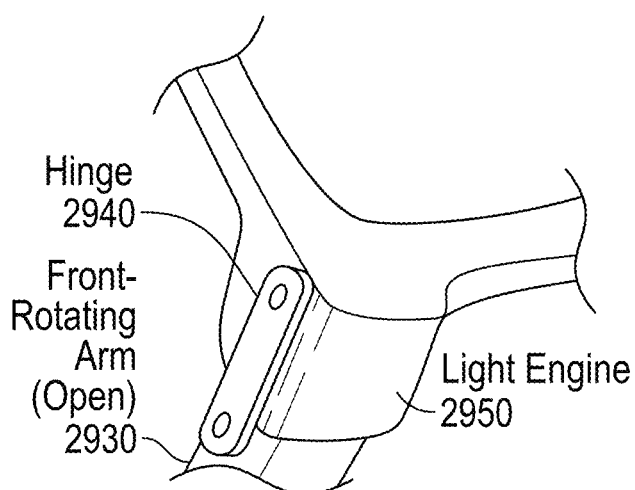
Figure 29D:
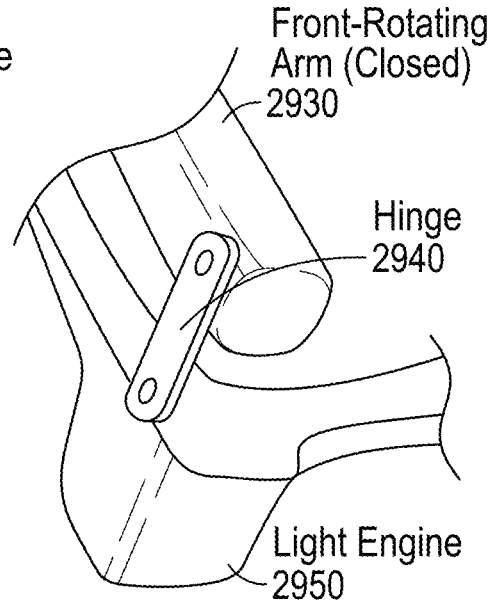

FIGS. 29A-29D illustrate one embodiment of glasses with a front rotating arm, in which the closed position has the arms in front of the lenses. FIG. 29A illustrates the open position, in which the arms are in a wearable configuration. FIG. 29B illustrates the closed position, in which the arms are positioned in front of the lenses. This is implemented in one embodiment using a dual hinge 2940 attached to the arm 2930 and to the frame of the glasses. In one embodiment, the hinge 2940 provides free movement around the joint, allowing the arm to stand out from the glasses, as well as rotate forward. In one embodiment, the hinge 2940 may also permit closure in the conventional configuration.

Figure 30A:
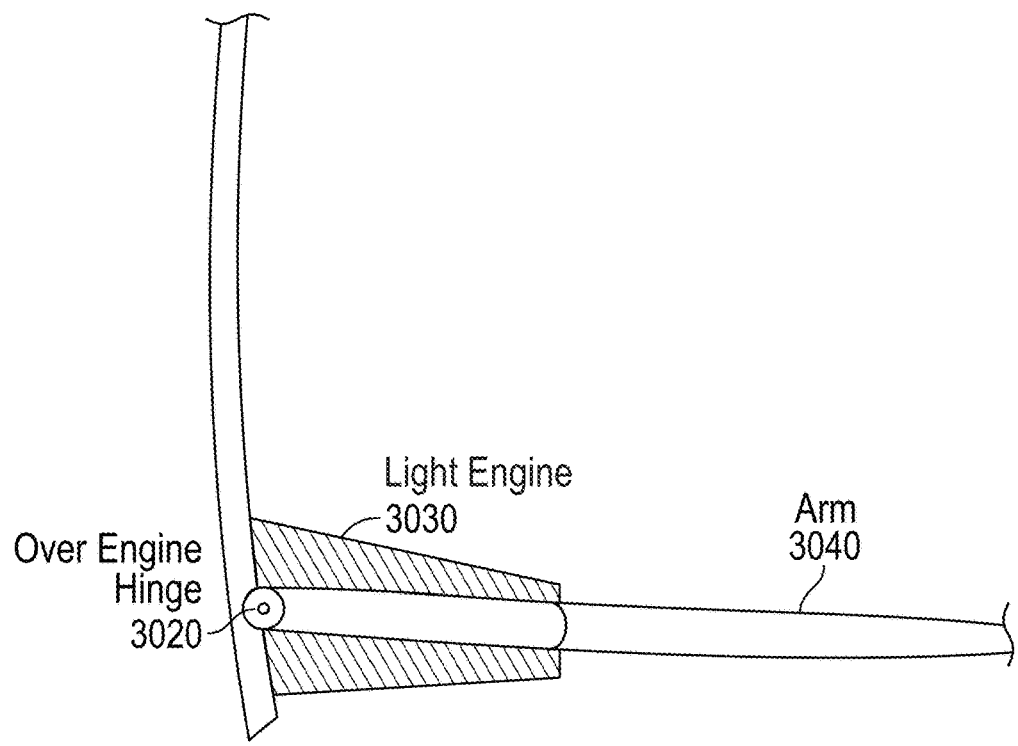
FIGS. 30A-30B illustrate one embodiment of an over-engine hinge.
Figure 30B:
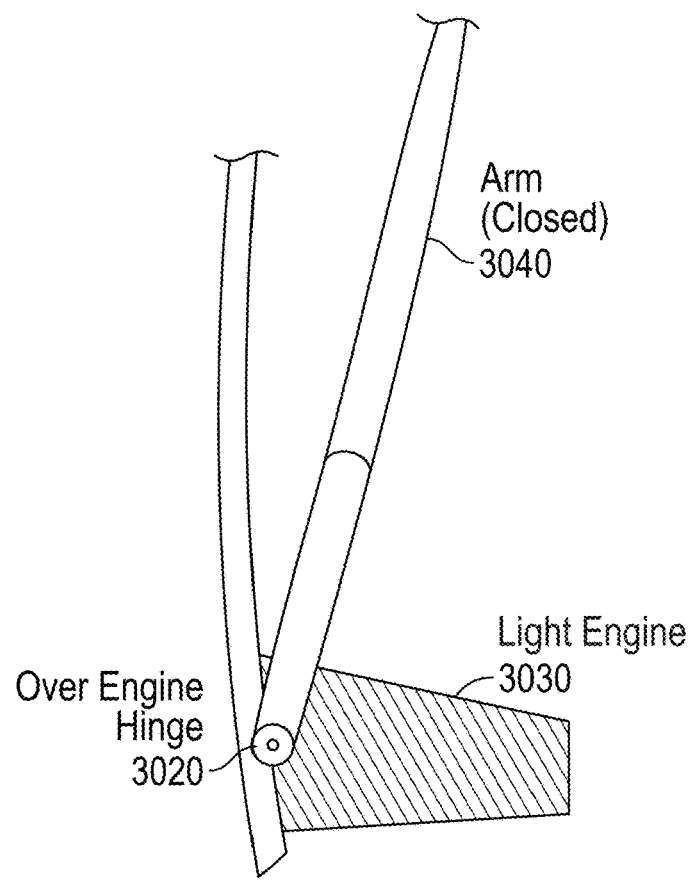

FIGS. 30A-30B illustrate one embodiment of an over-engine hinge 3020. A frame attachment element attaches a thin arm 3040 over the light engine 3030. Thus, the arm 3040 can move freely between the open and closed positions, without impacting the light engine 3030.

Figure 31:
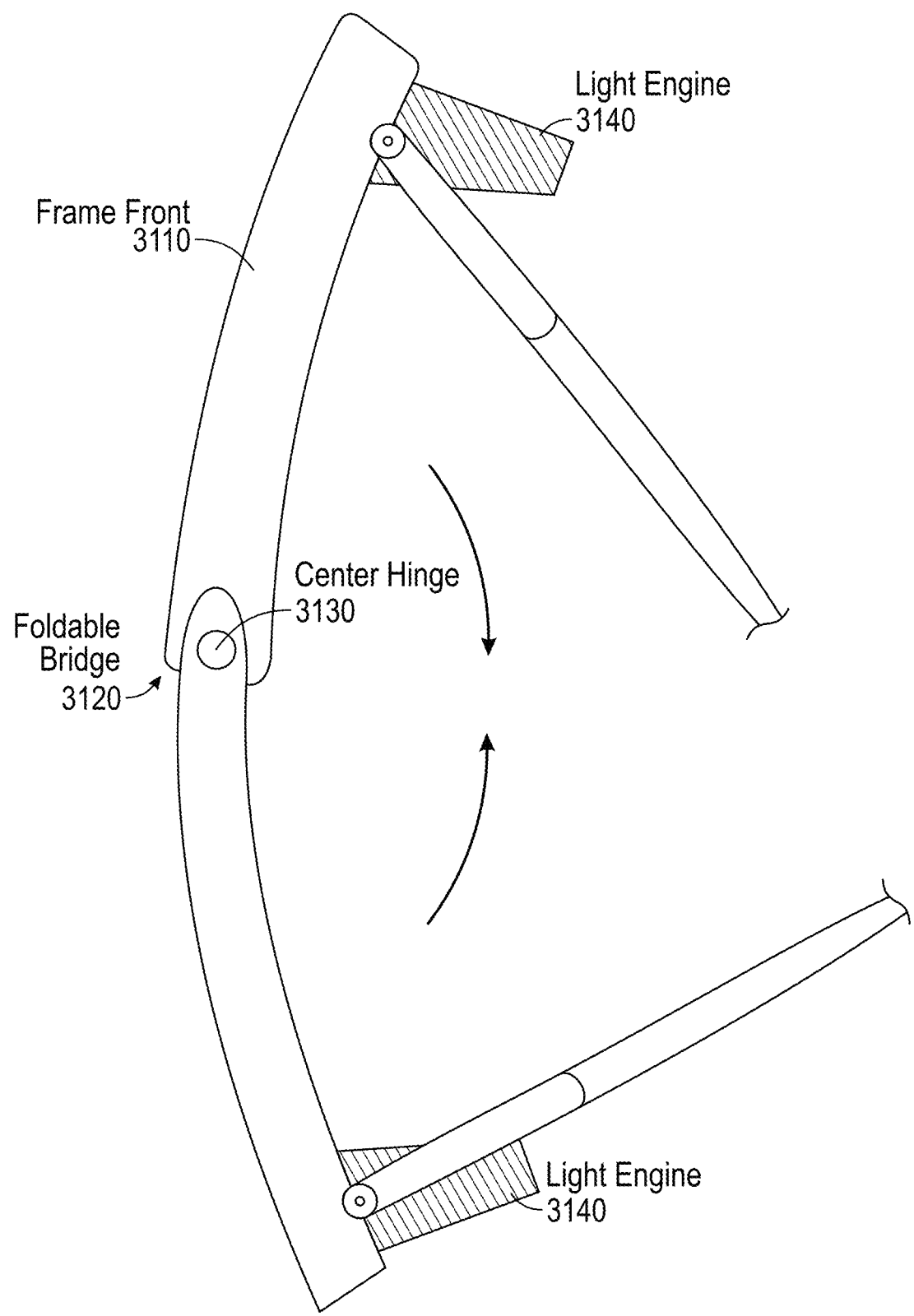
FIG. 31 illustrates one embodiment of glasses with a foldable bridge.

FIG. 31 illustrates one embodiment of glasses with a foldable bridge. A foldable bridge 3120 includes a center hinge 3130 which would allow the glasses to be folded shut. In one embodiment, the center hinge 3130 is offset, such that when folded the two light engines 3140 are offset from each other and do not impact each other. This allows storage of the glasses more compactly. In one embodiment, the center hinge 3130 may be a locking hinge that locks into the open position when it is opened.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:
1. A system comprising:
  optics;
  an illumination system comprising:
    one or more light sources;
    an illumination light combiner to create a color combined illumination pupil from light from the one or more light sources, and to direct the color combined illumination pupil to the optics;
  a liquid crystal on silicon display panel (LCOS) to modulate the light from the optics and to direct the modulated light back to the optics, an output pupil of the LCOS matched to the color combined illumination pupil created by the illumination light combiner;
  an in-coupler to a combiner waveguide to receive the modulated light from the LCOS, after it passes through the optics;

wherein the color combined illumination pupil from the illumination system is directed through the optics, then to the LCOS for modulation, and back to the optics, such that the color combined illumination pupil directed to the LCOS and the modulated light from the LCOS both pass through a shared subset of the optics.

2. The system of claim 1, wherein the light that exits the illumination system and lands on the LCOS falls within a volume of the light that forms a limiting output pupil of the optics.

3. The system of claim 1, wherein the illumination light combiner comprises an illumination waveguide.

4. The system of claim 3, wherein an out-coupler of the illumination waveguide directs the light to a projection optomechanical system;
the light from the LCOS passes through the illumination waveguide before entering the in-coupler of the combiner waveguide.

5. The system of claim 3, wherein the illumination waveguide has an input portion and an output portion, and further comprising:
a turning coupler in the illumination waveguide between the input portion and the output portion, to enable a change of angles between the input portion and the output portion.

6. The system of claim 3, wherein the illumination waveguide comprises an input portion, an output portion, and a flexible portion between the input portion and the output portion.

7. The system of claim 3, wherein light from an out-coupler of the illumination waveguide passes through a portion of the combiner waveguide before passing through a projection optomechanical system.

8. The system of claim 1, further comprising:
the illumination light combiner having a first out-coupler for the light having a first polarization state, and a second out-coupler for the light having a second polarization state;
a first projection optomechanical system and the LCOS to modulate the light having the first polarization state for display to a first eye of a user; and
a second projection optomechanical system and a second combiner waveguide, for modulating the light having the second polarization state for display to a second eye of the user.

9. The system of claim 1, further comprising:
a polarizing beam splitter, to split the light after it passes through a projection optomechanical system;
wherein light with a first polarization passes to the LCOS, and light with a second polarization is directed to a steerable optics system, the steerable optics system comprising:
steerable optics;
a steering element; and
a steerable display LCOS;
wherein light positioned by the steerable optics returns to the polarizing beam splitter to be combined with the light with the first polarization, and is in-coupled into the combiner waveguide.

10. The system of claim 1, further comprising:
the illumination light combiner comprising a waveguide including a first out-coupler to out-couple light with a first polarization, the light with the first polarization to pass through a projection optomechanical system to the LCOS, and a second out-coupler to out-couple light with a second polarization, the light with the second polarization directed through steerable display optics and a steerable display LCOS; and
the in-coupler of the combiner waveguide in-coupling light with the first polarization, and the combiner waveguide including a second in-coupler to in-couple the light from the steerable display LCOS.

11. The system of claim 1, wherein the optics, the illumination system, and the LCOS are on one side of the combiner waveguide.

12. The system of claim 1, wherein the illumination light combiner comprises an illumination prism.

13. A system comprising:
a combiner waveguide having a first side and a second side;
optics on the first side of the combiner waveguide;
an illumination system on the first side of the combiner waveguide to direct a light from one or more light sources to the optics, without passing through the combiner waveguide;
a liquid crystal on silicon display panel (LCOS) on the first side of the combiner waveguide to modulate the light from the optics and to direct the modulated light back to the optics;
an in-coupler to the combiner waveguide to receive the modulated light from the LCOS, after it passes through the optics;
such that the illumination light to the LCOS and the modulated light from the LCOS both pass through a shared subset of the optics, and the optics, the illumination system, and the LCOS are on the first side of the combiner waveguide.

14. The system of claim 13, wherein the illumination system comprises an illumination prism.

15. The system of claim 13, wherein an input pupil formed by the light that exits the illumination system and lands on the LCOS falls within a volume of the light that forms a limiting output pupil of the optics, and an output pupil matches the input pupil.

16. The system of claim 15, wherein the illumination system further comprises a reflective element, to turn light from the one or more light sources into a pupil location.

17. The system of claim 13, wherein the combiner waveguide comprises a separate waveguide for each color of the light.

18. The system of claim 13, further comprising:
a first projection optomechanical system and the LCOS modulate the light having a first polarization state for display to a first eye of a user; and
a second projection optomechanical system and a second combiner waveguide, for modulating the light having a second polarization state for display to a second eye of the user.

19. The system of claim 13, wherein a projection optomechanical system comprises:
a polarizing beam splitter;
two mirrors, each of the mirrors having an associated quarter-wave plate;
such that when the light enters the projection optomechanical system, the light is reflected from a first mirror, passing through the quarter-wave plate twice, before impacting the LCOS.

20. The system of claim 13, further comprising:
a polarizing beam splitter, to split the light after it passes through a projection optomechanical system;

wherein light with a first polarization passes to the LCOS, and light with a second polarization is directed to a steerable optics system, the steerable optics system comprising:

steerable optics;

a steering element; and a steerable display LCOS;

wherein light positioned by the steerable optics system returns to the polarizing beam splitter to be combined with the light with the first polarization, and is in-coupled into the combiner waveguide.

21. The system of claim 13, wherein the illumination system further comprises:

an illumination light combiner to create a color combined illumination pupil from the light, and to direct the color combined illumination pupil to the optics.

22. The system of claim 13, further comprising:

the combiner waveguide having near side and a far side, the near side of the combiner waveguide including an out-coupler to direct an image to a user;

wherein the illumination system is on the near side of the combiner waveguide.

23. The system of claim 13, wherein the illumination system, a projection optomechanical system, and the LCOS comprise a light engine, and the combiner waveguide is part of a lens of smart glasses, the system further comprising:

hinges on arms of the smart glasses to fold the arms without exerting force on an enclosure protecting the light engine located at the hinges.

24. The system of claim 23, further comprising:

a first hinge attached to a lens rim, to provide fitting flexibility, and a second hinge at which the arms are folded.

25. The system of claim 13, wherein the illumination system comprises an illumination waveguide.

26. A system comprising:

a combiner waveguide to display an image to a user, the combiner waveguide having a near side and a far side;

optics;

an illumination system comprising an illumination prism to direct a-unmodulated light from one or more light sources to the optics, the illumination system positioned on the near side of the combiner waveguide;

a liquid crystal on silicon display panel (LCOS) to receive the unmodulated light from the optics, to modulate the light, and to direct the modulated light back to the optics;

an in-coupler of the combiner waveguide to receive the modulated light from the LCOS, after it passes through the optics;

such that the illumination light to the LCOS and the modulated light from the LCOS both pass through a shared subset of the optics.

\* \* \* \* \*